US009924345B2

(12) United States Patent
Sasaki et al.

(10) Patent No.: US 9,924,345 B2
(45) Date of Patent: Mar. 20, 2018

(54) INFORMATION PROCESSING APPARATUS, INFORMATION PROCESSING SYSTEM, AND INFORMATION PROCESSING METHOD FOR TRANSMITTING DISPLAY INFORMATION IN RESPONSE TO A USER SWITCHING FROM A FIRST TERMINAL TO A SECOND TERMINAL

(71) Applicant: FUJI XEROX CO., LTD., Tokyo (JP)

(72) Inventors: Shigehiko Sasaki, Kanagawa (JP); Shin Otake, Kanagawa (JP); Kazutoshi Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 215 days.

(21) Appl. No.: 14/884,980

(22) Filed: Oct. 16, 2015

(65) Prior Publication Data
US 2016/0381162 A1 Dec. 29, 2016

(30) Foreign Application Priority Data

Jun. 29, 2015 (JP) ................................. 2015-130050

(51) Int. Cl.
*G06F 15/16* (2006.01)
*H04W 8/18* (2009.01)
(Continued)

(52) U.S. Cl.
CPC ............ *H04W 8/18* (2013.01); *G06F 3/1423* (2013.01); *H04L 67/145* (2013.01);
(Continued)

(58) Field of Classification Search
CPC ........................................ H04L 67/14–67/148
See application file for complete search history.

(56) References Cited

U.S. PATENT DOCUMENTS 8,023,499 B2 * 9/2011 Moriwaki ......... H04W 36/0005
370/360
9,106,696 B2 * 8/2015 Pahlavan ............... G06F 9/4445
(Continued)

FOREIGN PATENT DOCUMENTS

JP 2007-304798 A 11/2007

*Primary Examiner* — David Lazaro
*Assistant Examiner* — Julian Chang
(74) *Attorney, Agent, or Firm* — Sughrue Mion, PLLC

(57) ABSTRACT

An information processing apparatus includes following components. A memory stores user identification information identifying a user, terminal identification information identifying a terminal used as a user interface of the information processing apparatus, and operational context information indicating a status of an operation performed on the terminal in association with one another. An execution unit executes a process. A memory controller controls, in response to the user switching the terminal from a first terminal to a second terminal, the memory to change the terminal identification information from information identifying the first terminal to information identifying the second terminal. The transmission unit transmits, in response to occurrence of information to be displayed in relation to the process started in response to an operation on the first terminal, display information used to display a window corresponding to the operational context information to the second terminal if the terminal identification information has been changed.

7 Claims, 18 Drawing Sheets

(51) Int. Cl.
  *H04W 4/00*    (2018.01)
  *H04W 12/06*   (2009.01)
  *G06F 3/14*    (2006.01)
  *H04L 29/08*   (2006.01)
  *G06F 21/60*   (2013.01)

(52) U.S. Cl.
  CPC ........... *H04L 67/148* (2013.01); *H04W 4/008* (2013.01); *H04W 12/06* (2013.01); *G06F 21/608* (2013.01)

(56) References Cited

U.S. PATENT DOCUMENTS

| | | | | |
|---|---|---|---|---|
| 2003/0101343 A1* | 5/2003 | Eaton | | H04L 51/04 713/170 |
| 2008/0304660 A1* | 12/2008 | Sawayanagi | | H04L 9/3236 380/44 |
| 2010/0057853 A1* | 3/2010 | Xu | | H04L 67/14 709/204 |
| 2010/0115470 A1* | 5/2010 | Tanji | | G06F 9/5038 715/840 |
| 2011/0179466 A1* | 7/2011 | Hamada | | H04N 1/00464 726/3 |
| 2013/0117392 A1* | 5/2013 | Aceves | | G06Q 10/107 709/206 |
| 2013/0326072 A1* | 12/2013 | Smyth | | H04L 67/141 709/227 |
| 2014/0012892 A1* | 1/2014 | Jaudon | | H04L 67/141 709/203 |
| 2014/0185088 A1 | 7/2014 | Lee et al. | | |
| 2014/0188987 A1* | 7/2014 | Miller | | H04L 29/06 709/203 |
| 2014/0215374 A1* | 7/2014 | Nakao | | H04N 1/00517 715/771 |
| 2014/0258441 A1* | 9/2014 | L'Heureux | | H04W 12/06 709/217 |
| 2014/0259147 A1* | 9/2014 | L'Heureux | | H04L 63/02 726/14 |
| 2014/0280635 A1* | 9/2014 | Bengochea | | H04L 51/22 709/206 |
| 2015/0188914 A1* | 7/2015 | Osawa | | H04L 63/083 726/5 |
| 2015/0326514 A1* | 11/2015 | Liberty | | G06Q 10/10 709/206 |
| 2016/0026414 A1* | 1/2016 | Sako | | G06F 3/1222 358/1.14 |
| 2016/0036854 A1* | 2/2016 | Himawan | | H04L 63/20 726/5 |
| 2016/0112464 A1* | 4/2016 | Nyshadham | | H04L 65/1083 709/227 |
| 2016/0142211 A1* | 5/2016 | Metke | | H04L 9/3263 713/175 |
| 2016/0210094 A1* | 7/2016 | Nishikawa | | G06F 3/1267 |
| 2017/0134995 A1* | 5/2017 | L'Heureux | | H04W 36/0022 |

* cited by examiner

FIG. 8

| USER IDENTIFICATION INFORMATION | ANONYMOUS | |
|---|---|---|
| TERMINAL IDENTIFICATION INFORMATION | LOCAL PANEL UNIT (127.0.0.1) | |
| OPERATIONAL CONTEXT INFORMATION | INITIAL WINDOW | (DISPLAYED) |
| LOGIN STATUS | LOGGED IN | |
| PROCESS STATUS | NONE | |

FIG. 9

| USER IDENTIFICATION INFORMATION | USER A | |
|---|---|---|
| TERMINAL IDENTIFICATION INFORMATION | LOCAL PANEL UNIT (127.0.0.1) | |
| OPERATIONAL CONTEXT INFORMATION | MENU WINDOW | SCAN PROCESS SELECTED |
| LOGIN STATUS | LOGGED IN | |
| PROCESS STATUS | NONE | |

FIG. 10

| USER IDENTIFICATION INFORMATION | USER A | |
|---|---|---|
| TERMINAL IDENTIFICATION INFORMATION | LOCAL PANEL UNIT (127.0.0.1) | |
| OPERATIONAL CONTEXT INFORMATION | MENU WINDOW | SCAN PROCESS SELECTED |
| | SERVER ADDRESS INPUT WINDOW | (DISPLAYED) |
| LOGIN STATUS | LOGGED IN | |
| PROCESS-RELATED INFORMATION | SCAN PROCESS<br>·RESOLUTION: 200 dpi<br>·DESTINATION: SERVER X<br>·USER NAME: USER A<br>·PASSWORD: PASSWORD OF USER A | |
| PROCESS STATUS | IN EXECUTION | |

FIG. 11

| USER IDENTIFICATION INFORMATION | USER A | |
|---|---|---|
| TERMINAL IDENTIFICATION INFORMATION | NONE | |
| OPERATIONAL CONTEXT INFORMATION | MENU WINDOW | SCAN PROCESS SELECTED |
| | SERVER ADDRESS INPUT WINDOW | EXECUTE BUTTON PRESSED |
| | IN-EXECUTION WINDOW | (DISPLAYED) |
| LOGIN STATUS | LOGGED OUT | |
| PROCESS-RELATED INFORMATION | SCAN PROCESS<br>·RESOLUTION: 200 dpi<br>·DESTINATION: SERVER X<br>·USER NAME: USER A<br>·PASSWORD: PASSWORD OF USER A | |
| PROCESS STATUS | IN EXECUTION | |

FIG. 12

| USER IDENTIFICATION INFORMATION | USER A | |
|---|---|---|
| TERMINAL IDENTIFICATION INFORMATION | REMOTE PANEL UNIT (192.168.X.X) | |
| OPERATIONAL CONTEXT INFORMATION | MENU WINDOW | SCAN PROCESS SELECTED |
| | SERVER ADDRESS INPUT WINDOW | EXECUTE BUTTON PRESSED |
| | IN-EXECUTION WINDOW | (DISPLAYED) |
| LOGIN STATUS | LOGGED IN | |
| PROCESS-RELATED INFORMATION | SCAN PROCESS<br>·RESOLUTION: 200 dpi<br>·DESTINATION: SERVER X<br>·USER NAME: USER A<br>·PASSWORD: PASSWORD OF USER A | |
| PROCESS STATUS | IN EXECUTION | |

FIG. 13

| USER IDENTIFICATION INFORMATION | USER A | |
|---|---|---|
| TERMINAL IDENTIFICATION INFORMATION | REMOTE PANEL UNIT (192.168.X.X) | |
| OPERATIONAL CONTEXT INFORMATION | MENU WINDOW | SCAN PROCESS SELECTED |
| | SERVER ADDRESS INPUT WINDOW | EXECUTE BUTTON PRESSED |
| | IN-EXECUTION WINDOW | — |
| | ERROR NOTIFICATION WINDOW | PASSWORD RE-INPUT |
| LOGIN STATUS | LOGGED IN | |
| PROCESS-RELATED INFORMATION | SCAN PROCESS<br>·RESOLUTION: 200 dpi<br>·DESTINATION: SERVER X<br>·USER NAME/PASSWORD (UPDATE) | |
| PROCESS STATUS | SUSPENDED | |

FIG. 14

| USER IDENTIFICATION INFORMATION | USER A | |
|---|---|---|
| TERMINAL IDENTIFICATION INFORMATION | REMOTE PANEL UNIT (192.168.X.X) | |
| OPERATIONAL CONTEXT INFORMATION | MENU WINDOW | SCAN PROCESS SELECTED |
| | SERVER ADDRESS INPUT WINDOW | EXECUTE BUTTON PRESSED |
| | IN-EXECUTION WINDOW | — |
| | ERROR NOTIFICATION WINDOW | PASSWORD RE-INPUT |
| LOGIN STATUS | LOGGED IN | |
| PROCESS-RELATED INFORMATION | SCAN PROCESS<br>·RESOLUTION: 200 dpi<br>·DESTINATION: SERVER X<br>·USER NAME/PASSWORD (UPDATE) | |
| PROCESS STATUS | COMPLETED | |

FIG. 15

| USER IDENTIFICATION INFORMATION | USER A | |
|---|---|---|
| TERMINAL IDENTIFICATION INFORMATION | REMOTE PANEL UNIT (192.168.X.X) | |
| OPERATIONAL CONTEXT INFORMATION | MENU WINDOW | SCAN PROCESS SELECTED |
| | SERVER ADDRESS INPUT WINDOW | EXECUTE BUTTON PRESSED |
| | IN-EXECUTION WINDOW | — |
| | ERROR NOTIFICATION WINDOW | PASSWORD RE-INPUT |
| LOGIN STATUS | LOGGED IN | |
| PROCESS STATUS | NONE | |

FIG. 23

```
| Unsuccessful Authentication                          |
| The password has expired.  Please input a new password. |
|                                                      |
| Password  [                    ]                     |
```

```
| Transfer to Server Completed                         |
|                                                      |
|            Scan Process Completed.                   |
|                                                      |
| Start Date/Time: XX.XX.2015 AM10:30                  |
```

G4

INFORMATION PROCESSING APPARATUS, INFORMATION PROCESSING SYSTEM, AND INFORMATION PROCESSING METHOD FOR TRANSMITTING DISPLAY INFORMATION IN RESPONSE TO A USER SWITCHING FROM A FIRST TERMINAL TO A SECOND TERMINAL

CROSS-REFERENCE TO RELATED APPLICATIONS

This application is based on and claims priority under 35 USC 119 from Japanese Patent Application No. 2015-130050 filed Jun. 29, 2015.

BACKGROUND (i) Technical Field

The present invention relates to an information processing apparatus, an information processing system, and an information processing method.

(ii) Related Art

In the case where an information processing apparatus uses not only an operation panel thereof but also a user terminal as its user interface, the user sometimes operates the information processing apparatus by using the operation panel and then by using another terminal, such as a smartphone or a tablet terminal.

SUMMARY

According to an aspect of the invention, there is provided an information processing apparatus including a memory, an execution unit, a memory controller, and a transmission unit. The memory stores user identification information, terminal identification information, and operational context information in association with one another. The user identification information is information identifying a user. The terminal identification information is information identifying a terminal that is used as a user interface of the information processing apparatus and that displays a window corresponding to an operation performed by the user. The operational context information is information indicating a status of the operation performed on the terminal. The execution unit executes a process. The memory controller controls, in response to the user switching the terminal used for operation from a first terminal to a second terminal, the memory to change the terminal identification information associated with the user identification information identifying the user from information identifying the first terminal to information identifying the second terminal. The transmission unit transmits, in response to occurrence of information to be displayed in relation to the process started in response to an operation performed by using the first terminal, display information to the second terminal in a case where the terminal identification information has been changed. The display information is information used to display a window associated with the status indicated by the operational context information that is associated with the terminal identification information.

BRIEF DESCRIPTION OF THE DRAWINGS

An exemplary embodiment of the present invention will be described in detail based on the following figures, wherein:

FIG. 8 illustrates an example of session information;
FIG. 9 illustrates an example of the session information;
FIG. 10 illustrates an example of the session information;
FIG. 11 illustrates an example of the session information;
FIG. 12 illustrates an example of the session information;
FIG. 13 illustrates an example of the session information;
FIG. 14 illustrates an example of the session information;
FIG. 15 illustrates an example of the session information;
FIG. 23 illustrates an error notification window;
FIG. 24 illustrates a scan process completion window.

DETAILED DESCRIPTION

1 Exemplary Embodiment
1-1 Configuration

Figure 1:
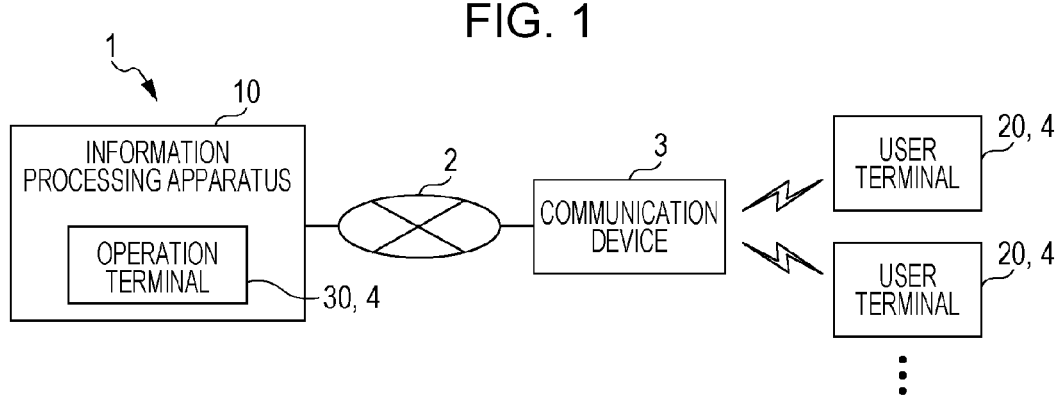
FIG. 1 illustrates an overall configuration of an information processing system.

FIG. 1 illustrates an overall configuration of an information processing system 1. The information processing system 1 includes a communication line 2, a communication device 3, an information processing apparatus 10, and plural user terminals 20. In this exemplary embodiment, the information processing system 1 provides a user with functions, such as copy, scan, fax, and print (output of image data on a medium).

Examples of the communication line 2 include the Internet, a mobile communication network, and a telephone line. The communication line 2 implements communication between apparatuses connected thereto. The information processing apparatus 10 and the communication device 3 are connected to the communication line 2. The communication device 3 is an apparatus having a communication function. In this exemplary embodiment, the communication device 3 performs wireless communication based on a wireless local area network (LAN) standard. The communication device 3 wirelessly communicates with the user terminals 20. The communication device 3 also communicates with the information processing apparatus 10 via the communication line 2. That is, the information processing apparatus 10 communicates with the user terminals 20 via the communication line 2 and the communication device 3.

The information processing apparatus 10 executes processes, such as an image forming process for forming an image on a medium and an image scanning process for scanning an image on a medium. These processes are executed when the aforementioned functions, such as copy, scan, fax, and print, are provided to the user. The information processing apparatus 10 includes an operation terminal 30 that is used to operate the information processing apparatus 10. The operation terminal 30 is one of terminals (hereinafter, referred to as "user interface (UI) terminals") that are used as the user interface of the information processing apparatus 10.

A user interface is an interface that allows the user to exchange information with an operation-target apparatus (i.e., the information processing apparatus 10 in this exemplary embodiment). The user operates the operation-target apparatus by using the UI terminal. The UI terminal displays a window on which the user performs an operation and a window corresponding to the operation (e.g., a window displaying the result of the operation). The operation terminal 30 is fixed on a housing of the information processing apparatus 10 and is used by a user who visits the place where the information processing apparatus 10 is installed.

Each of the user terminals 20 is a terminal used by a user. The user terminals 20 may be, for example, smartphones, tablet terminals, and personal computers. Each of the user terminals 20 communicates with the information processing apparatus 10 to exchange data used to operate the information processing apparatus 10. Each of the user terminals 20 is one of the UI terminals of the information processing apparatus 10. As described above, the user terminals 20 and the operation terminal 30 are UI terminals of the information processing apparatus 10 and are collectively referred to as UI terminals 4 below when they are not distinguished from one another.

Figure 2:
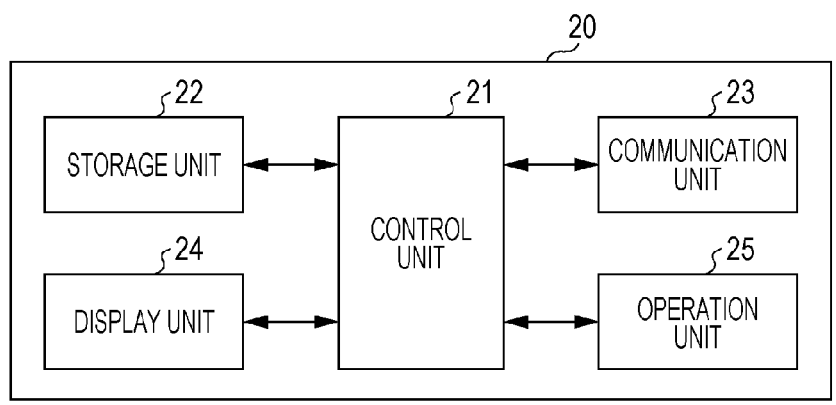
FIG. 2 illustrates a hardware configuration of a user terminal.

FIG. 2 illustrates a hardware configuration of the user terminal 20. The user terminal 20 is a computer including a control unit 21, a storage unit 22, a communication unit 23, a display unit 24, and an operation unit 25. The control unit 21 includes a central processing unit (CPU), a read-only memory (ROM), a random access memory (RAM), and a real-time clock. The CPU executes a program stored in the ROM or the storage unit 22 by using the RAM as its workspace, thereby controlling operations of the individual units. The real-time clock computes the current date/time and notifies the CPU of the current date/time. The storage unit 22 includes, for example, a flash memory. The storage unit 22 stores data and programs (e.g., a web application such as a browser) used by the control unit 21 to perform control, and image data, for example.

The communication unit 23 includes an antenna and a communication circuit that performs wireless communication based on a wireless LAN standard. For example, the communication unit 23 wirelessly communicates with the communication device 3 illustrated in FIG. 1. The display unit 24 includes, for example, a liquid crystal display. The display unit 24 is controlled by the control unit 21 to display an image on the display screen. For example, in the case where the user terminal 20 is a smartphone or a tablet terminal, the operation unit 25 includes a touch sensor (also called a touchscreen or a touch panel) disposed on the display screen and buttons disposed on a housing of the user terminal 20, for example. The operation unit 25 accepts a user operation, such as tapping, and supplies the control unit 21 with operation data indicating the type of the operation. In the case where the user terminal 20 is a personal computer, the operation unit 25 may include a keyboard and a mouse. The control unit 21 performs control in accordance with the supplied operation data.

Figure 3:
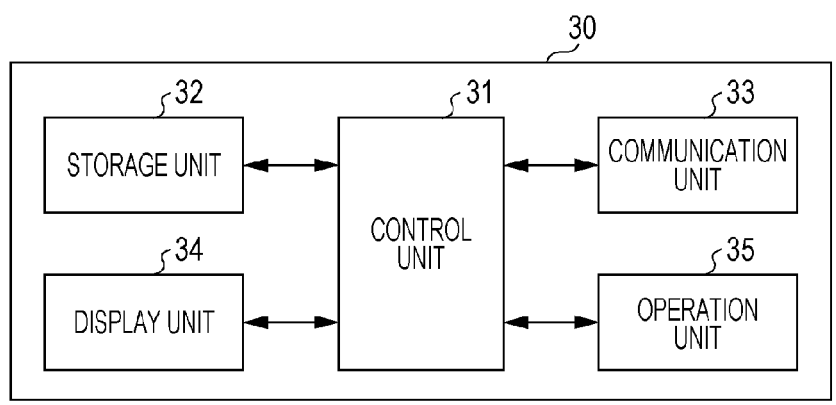
FIG. 3 illustrates a hardware configuration of an operation terminal.

FIG. 3 illustrates a hardware configuration of the operation terminal 30. The operation terminal 30 is a computer including a control unit 31, a storage unit 32, a communication unit 33, a display unit 34, and an operation unit 35. Each of the components of the operation terminal 30 other than the communication unit 33 is a hardware component equivalent to the corresponding component assigned the same name in FIG. 2. The communication unit 33 includes a communication circuit that performs communication based on a wired LAN standard and a port to which a connector of a communication cable (specifically, a LAN cable) is inserted.

Figure 4:
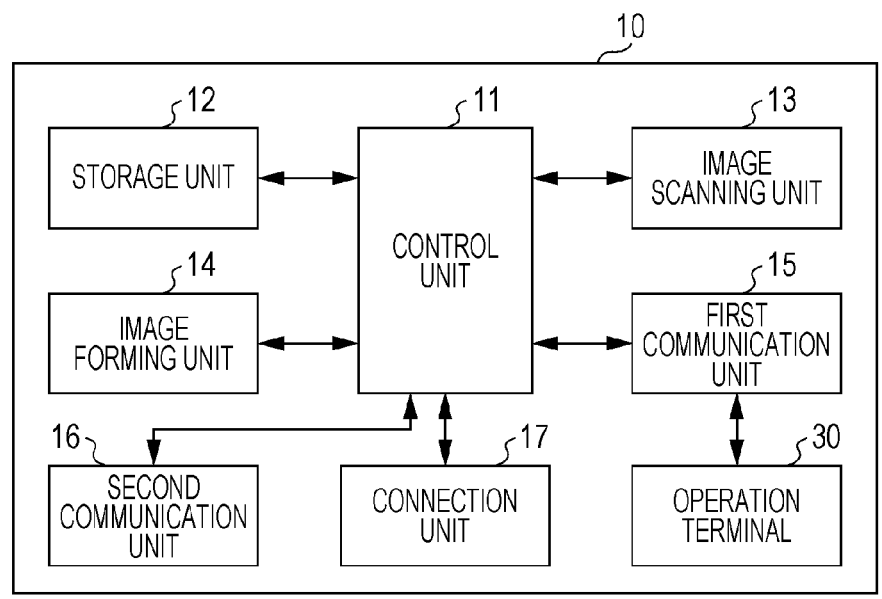
FIG. 4 illustrates a hardware configuration of an information processing apparatus.

FIG. 4 illustrates a hardware configuration of the information processing apparatus 10. The information processing apparatus 10 is a computer including a control unit 11, a storage unit 12, an image scanning unit 13, an image forming unit 14, a first communication unit 15, a second communication unit 16, and a connection unit 17. The information processing apparatus 10 also includes the above-described operation terminal 30 that functions as a UI unit. The control unit 11 controls each unit other than the operation terminal 30 in this exemplary embodiment. The control unit 11 is a hardware component equivalent to the control unit 21 illustrated in FIG. 2. The storage unit 12 includes, for example, a hard disk drive. The storage unit 12 stores data and programs used by the control unit 11 to perform control, and image data, for example.

The image scanning unit 13 executes an image scanning process for scanning an image on an original by using a charge coupled device (CCD) system, for example. The image scanning unit 13 optically scans an image of content on a medium, such as paper, and supplies image data representing the scanned image to the control unit 11. The image forming unit 14 executes an image forming process for forming an image on a medium by using an electrophotographic system, for example. The image forming unit 14 forms an image represented by image data supplied by the control unit 11 on a medium, such as paper. The aforementioned systems used to scan and form an image are merely examples, and other systems may be used. The first communication unit 15 is connected to the communication unit 33 of the operation terminal 30 by a communication cable or a data bus. The first communication unit 15 communicates with the operation terminal 30 without using any external apparatus. That is, the communication unit 33 communicates with the information processing apparatus 10 without using any external apparatus.

The second communication unit 16 serves as a communication interface and includes a communication circuit that performs communication based on a wired LAN standard or a wireless LAN standard, a port to which a connector of a communication cable (e.g., a LAN cable) is inserted, and a wireless transmitter/receiver based on the wireless LAN standard. The second communication unit 16 executes a communication process to communicate with an apparatus connected to this interface. The second communication unit 16 is connected to the communication line 2 illustrated in FIG. 1 and communicate with, for example, the user terminals 20 via an external apparatus (i.e., an external apparatus for the information processing apparatus 10, for example, the communication device 3). The connection unit 17 includes, for example, a slot to which a storage medium such as an SD memory card is connected. The connection unit 17 is connected to such a storage medium. The control unit 11 reads data stored on the storage medium and writes data to the storage medium via the connection unit 17. The operation terminal 30 includes the components described with reference to FIG. 3. The operation terminal 30 communicates with the first communication unit 15.

The control unit 11 of the information processing apparatus 10, the control unit 21 of the user terminal 20, and the control unit 31 of the operation terminal 30 execute programs and controls the individual units. In this way, functions described below are implemented.

Figure 5:
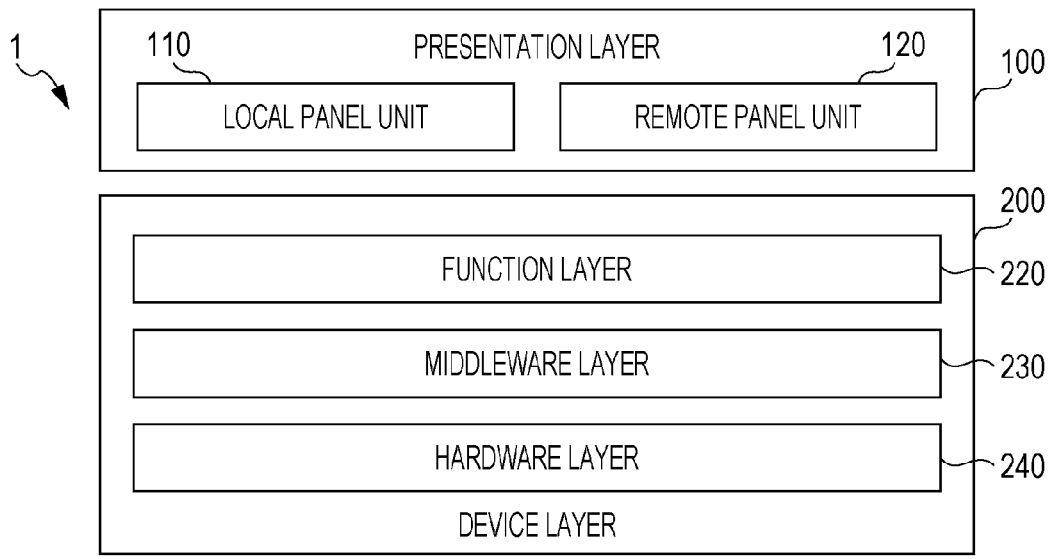
FIG. 5 illustrates a structure of functional layers of the information processing system.

FIG. 5 illustrates a structure of functional layers of the information processing system 1. The information processing system 1 includes a presentation layer 100 and a device layer 200. The presentation layer 100 is a layer that implements a function of accepting a user operation (i.e., a user interface). The device layer 200 is a layer that executes processes in response to user operations accepted by the presentation layer 100 and provides the aforementioned various functions, such as copy and scan.

The presentation layer 100 includes a local panel unit 110 and a remote panel unit 120. The local panel unit 110 is an operation panel included in the information processing apparatus 10. The local panel unit 110 is (locally) used by a user who visits the place where the information processing apparatus 10 is installed. The remote panel unit 120 is an operation panel connected to the information processing apparatus 10 via the communication line 2 and the communication device 3 illustrated in FIG. 1. The remote panel unit 120 is used by a user who is at a (remote) place apart from the information processing apparatus 10. The device layer 200 includes a function layer 220, a middleware layer 230, and a hardware layer 240. The function layer 220 is a layer that implements functions of processing data in accordance with an intended usage, such as a copy function and a scan function. The middleware layer 230 is a layer that is located between the function layer 220 and the hardware layer 240 and that executes general-purpose processes in response to user operations. The middleware layer 230 is an example of an "execution unit" according to an aspect of the present invention. The hardware layer 240 is a layer that physically implements processes, such as image scanning and image formation.

Figure 6:
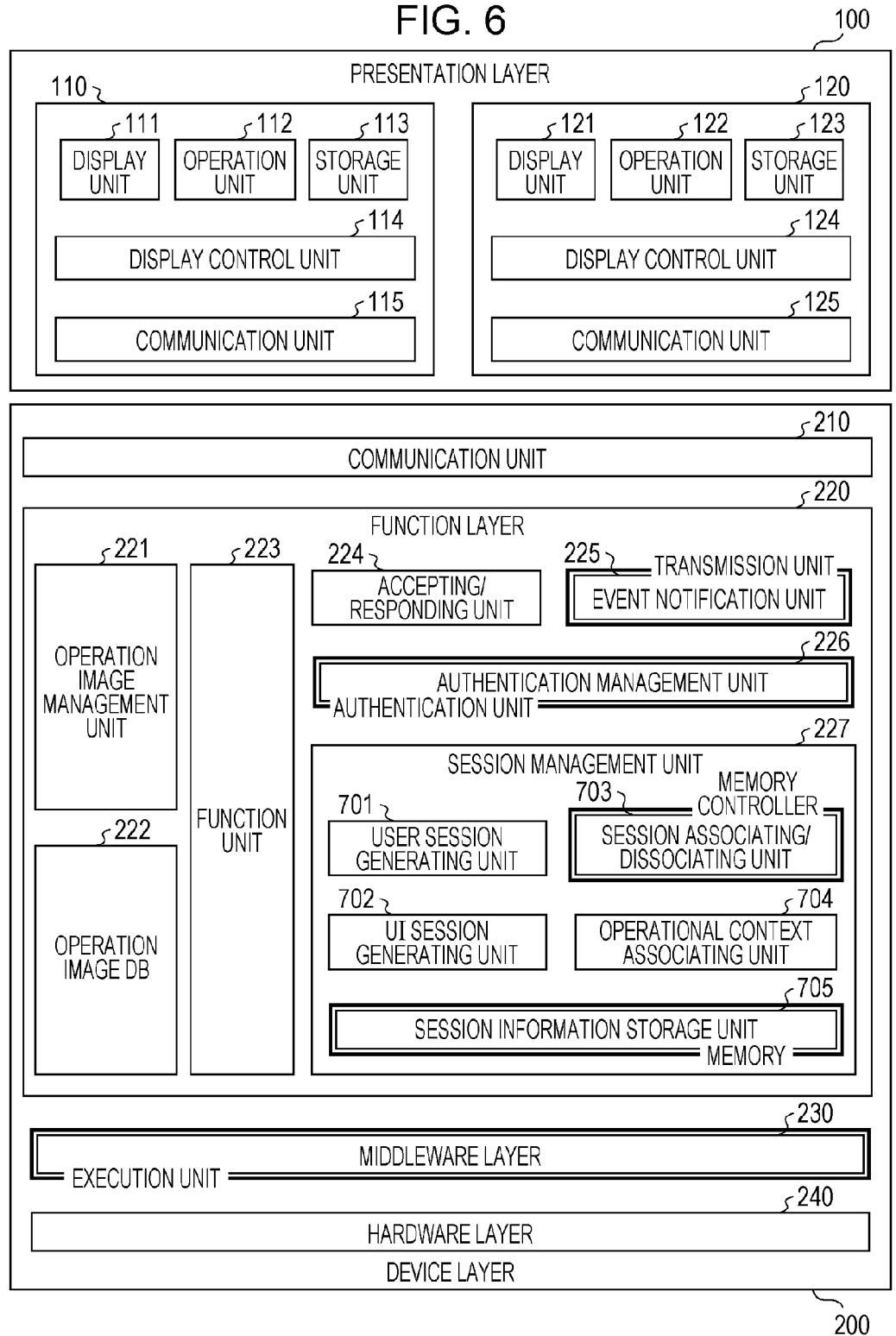
FIG. 6 illustrates details of a functional configuration of the information processing system.

FIG. 6 illustrates details of a functional configuration of the information processing system 1. The local panel unit 110 includes a display unit 111, an operation unit 112, a storage unit 113, a display control unit 114, and a communication unit 115. The display unit 111 displays an image. The operation unit 112 accepts a user operation. The storage unit 113 stores images to be displayed. The display control unit 114 controls the display unit 111 to display an image (hereinafter, referred to as an "operation image") used to operate the information processing apparatus 10 and information indicating the status of a process executed in response to the operation. The communication unit 115 controls communication between the display control unit 114 and the device layer 200. The remote panel unit 120 includes a display unit 121, an operation unit 122, a storage unit 123, a display control unit 124, and a communication unit 125. These units have functions equivalent to the components of the local panel unit 110 assigned the same names.

The device layer 200 includes a communication unit 210. The communication unit 210 implements communication between the information processing apparatus 10 and the presentation layer 100. The communication unit 210 implements communication based on Hypertext Transfer Protocol (HTTP, defined by RFC 7230, for example)/Hypertext Transfer Protocol Secure (HTTPS). In addition, the communication unit 210 implements Simple Object Access Protocol (SOAP)-based communication for communicating data written in Extensible Markup Language (XML) (hereinafter, referred to as "XML data"), for example. For example, the communication unit 210 receives XML data indicating an HTTP request that is transmitted from the presentation layer 100 and supplies the XML data to an operation image management unit 221 (described later). The communication unit 210 also receives, as a response, XML data indicating an HTTP response supplied by the operation image management unit 221 (described later) and transmits the XML data to the presentation layer 100.

The communication unit 210 also supports the WebSocket standard (defined by RFC 6455, for example). Based on this standard, once a connection to the presentation layer 100 is established as a result of a Transmission Control Protocol (TCP) handshake procedure, the communication unit 210 implements not only communication of XML data indicating an HTTP request and an HTTP response but also, for example, transmission of XML data from an event notification unit 225 (described later) to the presentation layer 100 at a given timing. With this configuration, not only so-called pull-type communication based on an HTTP request originating from the presentation layer 100 but also push-type communication originating from the information processing apparatus 10 are performed in the information processing system 1.

The function layer 220 includes the operation image management unit 221, an operation image database (DB) 222, a function unit 223, an accepting/responding unit 224, the event notification unit 225, an authentication management unit 226, and a session management unit 227. The operation image management unit 221 supplies the aforementioned operation images (i.e., images used to operate the information processing apparatus 10) to the UI terminal 4 via the communication unit 210. The operation image DB 222 stores the operation images (specifically, image data representing the operation images). In response to a request for the operation image from the UI terminal 4, the operation image management unit 221 transmits, via the communication unit 210, the requested operation image to the UI terminal 4 that has made the request.

The function unit 223 includes modules that implement functions provided to the user by the information processing apparatus 10.

Figure 7:
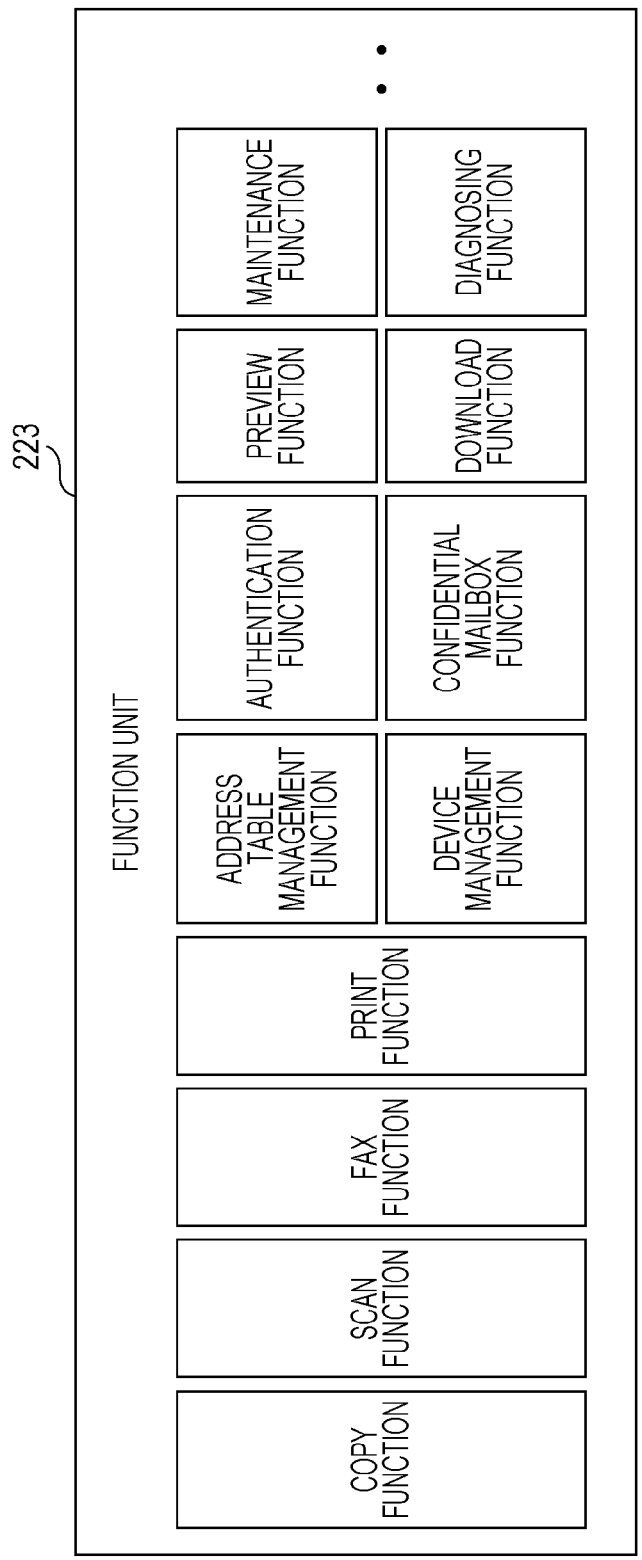
FIG. 7 illustrates an example of modules included in a function unit.

FIG. 7 illustrates an example of the modules included in the function unit 223. The function unit 223 includes modules that implement a copy function, a scan function, a fax function, a print function, an address table management function (a function of managing address information), a device management function (a function of managing the loading state of an original at the image scanning unit 13, and states of a medium and consumables used by the image forming unit 14), an authentication function, a confidential mailbox function (a function of managing electronic documents stored in the information processing apparatus 10), a preview function, a download function (a function of controlling updating of programs), a maintenance function (a function of performing maintenance of hardware in response to a remote request), and a diagnosing function (a function of making a diagnosis on hardware).

The function unit 223 executes, for example, a scan process, a fax transmission process, and a print process (processes for providing the scan function, the fax function, and the print function) as well as the aforementioned copy process. The copy process includes the image scanning process and the image forming process respectively executed by the image scanning unit 13 and the image forming unit 14 illustrated in FIG. 4. The scan process includes the image scanning process. The fax transmission process includes a fax transmission process executed by the second communication unit 16. The print process includes a communication process executed by the second communication unit 16 and the image forming process. The scan process and the fax transmission process may additionally include a data communication process using the second communication unit 16, a writing process for writing data to the storage unit 12, and a reading process for reading stored data from the storage unit 12 depending on how the data is acquired and output.

The function unit 223 is instructed to execute a process by the middleware layer 230. After starting executing the process, the function unit 223 supplies the session management unit 227 with information indicating the status of the process being executed. The function unit 223 also supplies the process execution result to the event notification unit 225 via the middleware layer 230.

The accepting/responding unit 224 accepts a request for a process from the presentation layer 100 and requests the function unit 223 to execute the process in accordance with the type of the process for which the request is accepted. In addition, the accepting/responding unit 224 transmits response data indicating a response to the accepted request (such as data indicating acceptance of the request or data indicating the status of the process) to the presentation layer 100 via the communication unit 210.

The event notification unit 225 notifies the presentation layer 100 of, for example, information indicating the status of the process, the information being supplied by the function unit 223 via the middleware layer 230. The authentication management unit 226 manages authentication information used in user authentication. When a user logs in to the information processing apparatus 10 or executes a process, the authentication management unit 226 checks the privilege granted to the user and authenticates the user who operates the information processing apparatus 10. The authentication management unit 226 is an example of an "authentication unit" according to an aspect of the present invention.

The session management unit 227 manages a connection of the UI terminal 4, the status of the operation on the UI terminal 4, and the status of the process. The session management unit 227 includes a user session generating unit 701, a UI session generating unit 702, a session associating/dissociating unit 703, an operational context associating unit 704, and a session information storage unit 705.

The term "session" refers to a series of operations or communications performed from when the UI terminal 4 establishes a connection to the information processing apparatus 10 to when the connection is disconnected or from when the user logs in to when the user logs out. Sessions are used as units in which the series of operations or communications is managed. The term "session" encompasses a user session and a UI session. A user session holds information concerning the status of operations performed by the user and information indicating the status of a process instructed by the user to be executed (hereinafter, referred to as "operational context information"). The operational context information includes, for example, the execution status of the process and the view status of the confidential mailbox. A UI session holds communication management information concerning communication with the user terminal 20 operated by the user. The communication management information includes information used to manage a communication connection, such as an Internet Protocol (IP) address and a type of a program (e.g., a browser) executed in the user terminal 20.

The user session generating unit 701 generates session information for each user who has logged in to the information processing apparatus 10. The session information for each user is information identifying the logged-in user (hereinafter, referred to as "user identification information") and is, for example, a character string indicating the user identification (ID) or the user name used for login.

The UI session generating unit 702 generates session information for each UI terminal 4 that accepts an operation. The session information for each UI terminal 4 is information identifying the UI terminal 4 (hereinafter, referred to as "terminal identification information") and is, for example, a character string ("LOCAL PANEL UNIT" or "REMOTE PANEL UNIT" in this exemplary embodiment) indicating whether the UI terminal 4 used is the local panel unit 110 or the remote panel unit 120 and an IP address of the UI terminal 4. For example, when multiple types of presentation applications (browsers) run in the same information processing apparatus 10, UI sessions are generated for the respective browsers.

The operational context associating unit 704 generates the above-described operational context information and stores the operational context information in association with the session information for the user in the session information storage unit 705, which stores session information and the like. The operational context associating unit 704 stores, as the operational context information, for example, information that associates information identifying an operation window (e.g., a character string "MENU WINDOW") and information identifying an operation performed on the window (e.g., a character string "SCAN PROCESS SELECTED") with each other.

The session associating/dissociating unit 703 associates the session information for each user with the session information for the corresponding UI terminal 4. Specifically, the session associating/dissociating unit 703 stores the generated user identification information and the generated terminal identification information in the session information storage unit 705 in association with each other. The session associating/dissociating unit 703 also associates the session information for each user with the operational context information for the user and information concerning a process executed as a result of an operation performed by the user. Specifically, the session associating/dissociating unit 703 stores the user identification information for the user, the operational context information for the user, the name of the process, and parameters in the session information storage unit 705 in association with one another.

The session information storage unit 705 stores session information according to the status of the session. How the session information stored in the session information storage unit 705 changes will be described with reference to FIGS. 8 to 15.

FIG. 8 illustrates an example of session information generated when the information processing apparatus 10 is booted. In the example illustrated in FIG. 8, user identification information "ANONYMOUS", terminal identification information "LOCAL PANEL UNIT (127.0.0.1)", operational context information "INITIAL WINDOW" and "(DISPLAYED)" indicating that the initial window is being displayed, a login status "LOGGED IN" indicating that an anonymous user has logged in, and a process status "NONE" indicating that no process is being executed are associated with one another.

The user identification information "ANONYMOUS" indicates a state where no particular user has logged in (i.e., an anonymous user has logged in), after the information processing apparatus 10 is booted before the first particular user logs in. The terminal identification information is represented by the name of the UI terminal 4 (i.e., "LOCAL PANEL UNIT" or "REMOTE PANEL UNIT") and the IP address of the UI terminal 4. FIG. 9 illustrates an example of the session information obtained in response to a user A performing a login operation in the state illustrated in FIG. 8.

In the example illustrated in FIG. 9, the user identification information and the operational context information now respectively indicate "USER A" and information indicating that an operation to select a scan process has been performed on a menu window ("MENU WINDOW", "SCAN PROCESS SELECTED") from the state illustrated in FIG. 8. The left field of the operational context information indicates the name of the displayed window, and the right field thereof indicates the operation performed by the user on the window. FIG. 10 illustrates an example of the session information obtained in response to the user A performing an operation to execute, for example, a scan process in the state illustrated in FIG. 9.

In the example illustrated in FIG. 10, the operational context information additionally includes information indicating that a "SERVER ADDRESS INPUT WINDOW" is being displayed and the process status has changed to "IN EXECUTION". In addition, process-related information is newly associated. The process-related information indicates that parameters of the "SCAN PROCESS" are "RESOLUTION: 200 dpi", "DESTINATION: SERVER X", "USER NAME: USER A", and "PASSWORD: PASSWORD OF USER A".

As described above, the session information storage unit 705 stores in association with one another the user identification information, the terminal identification information, and the operational context information indicating the status of the operation performed on the terminal identified by the terminal identification information. The session information storage unit 705 is an example of a "memory" according to an aspect of the present invention. The session associating/dissociating unit 703 controls the session information storage unit 705 to dissociate the pieces of information stored in association with the user identification information. For example, in response to the user A performing a logout operation by using the local panel unit 110 in the state where the pieces of information illustrated in FIG. 10 are stored, the session associating/dissociating unit 703 dissociates the terminal identification information from the user identification information.

FIG. 11 illustrates an example of the session information obtained as a result of the dissociation. The example illustrated in FIG. 11 is the session information obtained in response to a logout operation, which is performed after the operation to start executing the scan process has been performed in the state illustrated in FIG. 10. Specifically, the operational context information now indicates that an execute button is pressed on the server address input window ("SERVER ADDRESS INPUT WINDOW", "EXECUTE BUTTON PRESSED") and that an in-execution window is being displayed ("IN-EXECUTION WINDOW", "(DISPLAYED)"). Also, the login status has changed to "LOGGED OUT". As described above, the session information storage unit 705 maintains the association among the user identification information, the operational context information, the process-related information, and the process status even after the terminal identification information has been dissociated. FIG. 12 illustrates an example of the session information obtained in response to the user A performing a login operation by using the remote panel unit 120 thereafter.

In the example illustrated in FIG. 12, the terminal identification information and the login status have respectively changed to "REMOTE PANEL UNIT (192.168.x.x)" and "LOGGED IN" from the state illustrated in FIG. 11. Through FIGS. 10 to 12, the user A switches the UI terminal used for operation. The terminal used before the switching and the terminal used after the switching are hereinafter referred to as a first terminal (i.e., the operation terminal 30 in this example) and a second terminal (i.e., the user terminal 20 in this example), respectively.

In response to the switching, the session associating/dissociating unit 703 controls the session information storage unit 705 to change the terminal identification information that is associated with the user identification information (i.e., the character string "USER A" in this example) identifying the user from information identifying the first terminal to information identifying the second terminal (from "LOCAL PANEL UNIT (127.0.0.1)" to "REMOTE PANEL UNIT (192.168.x.x)" in this example). The session associating/dissociating unit 703 is an example of a "memory controller" according to an aspect of the present invention.

The remote panel unit 120 displays a window based on the operational context information associated with the terminal identification information thereof. Accordingly, in this exemplary embodiment, the event notification unit 225 transmits, to the second terminal, display information used to display a window associated with the status indicated by the operational context information. The event notification unit 225 transmits, for example, the operational context information as the display information. In such a case, the remote panel unit 120 reads and displays an operation image used on the window displayed in the status indicated by the operational context information transmitted from the event notification unit 225, from among the operation images transmitted from the operation image management unit 221 illustrated in FIG. 6. In the example illustrated in FIG. 12, an operation image used on a window that is displayed during execution of the scan process is read and displayed. In this way, the last window displayed on the local panel unit 110 is displayed on the remote panel unit 120.

The operational context information includes operation history information indicating a history of operations performed on the first terminal. The operation history information is information concerning a process and parameters selected by the user and a character string input by the user, for example. Based on the operation history indicated by the operational context information, the event notification unit 225 transmits, as the display information, information used to display a window displayed on the first terminal in the past. With this configuration, for example, when an operation to back the window to the previous one is performed on the remote panel unit 120, the remote panel unit 120 displays the "SERVER ADDRESS INPUT WINDOW" that is displayed immediately prior to the "IN-EXECUTION WINDOW" according to the operational context information, that is, the window displayed on the local panel unit 110 in the past. In addition, a character string input using the local panel unit 110 on the "SERVER ADDRESS INPUT WINDOW" is also displayed on the remote panel unit 120.

For example, in response to occurrence of information to be displayed in relation to a process (i.e., the scan process in this example) started in response to an operation performed by using the first terminal, the event notification unit 225 transmits the aforementioned display information to the second terminal in the case where the terminal identification information has been changed. The information to be displayed is, for example, information prompting the user to perform an operation to continue the process that is being executed by the function unit 223, such as an operation to input the password or an operation to input the address of a data storage location. This information includes information that is displayed when an error occurs in the process and information that is displayed to allow the user to confirm contents of the input, for example.

As described above, the second terminal displays a window by using the display information transmitted by the event notification unit 225. If the user performs an operation to continue the process by using the second terminal, the function unit 223 continues the process. For example, if the password input by the user to continue the selected scan process is erroneous (e.g., the password has expired or the like), the scan process is suspended. In this case, the event notification unit 225 transmits display information for displaying an error notification window indicating that the password is erroneous and prompting the user to perform an operation to input the correct password, and the remote panel unit 120 displays the error notification window. The user then performs an operation to input the correct password on the error notification window.

FIG. 13 illustrates an example of the session information obtained in response to re-inputting of the password. In the example illustrated in FIG. 13, the process status of the scan process indicates "SUSPENDED" and the operational context information for the remote panel unit 120 indicates "ERROR NOTIFICATION WINDOW" and "PASSWORD RE-INPUT". If the re-input password is correct, the process status changes again to "IN EXECUTION" from "SUSPENDED", and the scan process is continued. Upon completion of the continued scan process, the process status changes to "COMPLETED" as illustrated in FIG. 14. Thereafter, the process status changes to "NONE", and the process-related information is deleted as illustrated in FIG. 15.

1-2 Operation

An operation performed by the information processing system 1 from booting of the information processing apparatus 10 to completion of a process executed in response to a user instruction will be described below.

Figure 16:
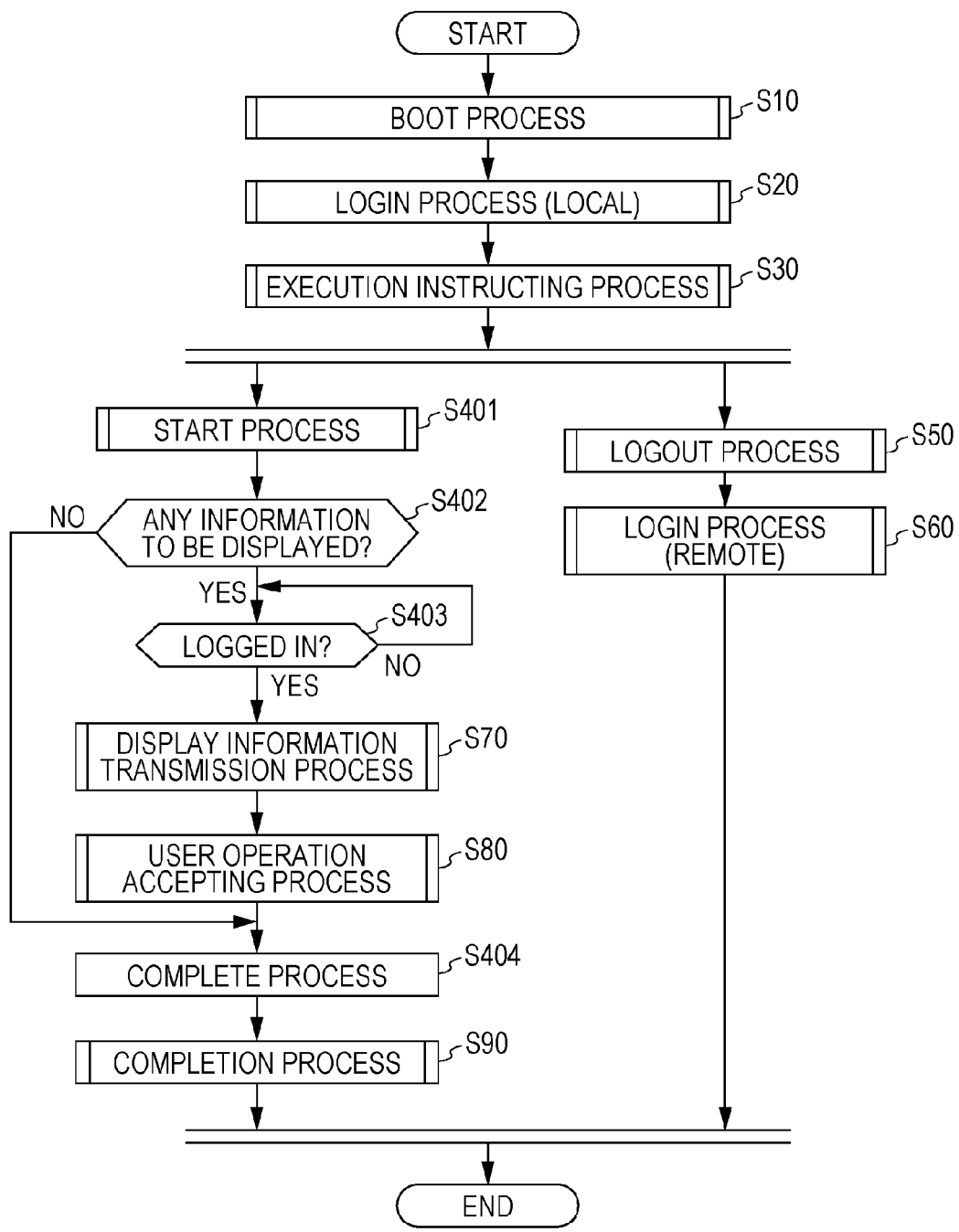
FIG. 16 illustrates an example of a procedure of an operation performed by the information processing system.

FIG. 16 illustrates an example of a procedure of the operation performed by the information processing system 1. The operation illustrated in FIG. 16 starts in response to a user powering on the information processing apparatus 10, for example. The information processing system 1 first executes a boot process to boot the information processing apparatus 10 (step S10).

In response to the user A performing a login operation by using the local panel unit 110 of the information processing apparatus 10 as the UI terminal 4, the information processing system 1 executes a login process (step S20). At that time, the information processing system 1 stores the terminal identification information for the local panel unit 110 in association with the user identification information for the user A. Then, in response to the user A performing an operation to instruct to start a process by using the local panel unit 110, the information processing system 1 executes a process to instruct the execution unit (i.e., the middleware layer 230 in this exemplary embodiment) that executes a process to execute the instructed process (step S30). In the example illustrated in FIG. 16, an operation to switch the UI terminal 4 from the local panel unit 110 to the remote panel unit 120 is performed in parallel with the operation for executing the instructed process.

First, the information processing apparatus 10 starts the process instructed to be executed in the execution instructing process (step S401). Then, the information processing apparatus 10 determines whether there is information to be displayed, such as information to be displayed upon occurrence of an error in the above-described process (step S402). Upon determining that there is information to be displayed (YES in step S402), the information processing apparatus 10 determines whether the user A has logged in (step S403). If the user A has not logged in (NO in step S403), the information processing apparatus 10 repeats the operation of step S403.

In the example illustrated in FIG. 16, in response to the user A performing a logout operation by using the local panel unit 110 after the process has been started in step S401, the information processing apparatus 10 executes a logout process (step S50). In response to the user A performing a login operation by using the remote panel unit 120 as the UI terminal 4 thereafter, the information processing apparatus 10 executes a login process again (step S60). If it is determined in step S403 that the user A has logged in (YES in step S403), the information processing apparatus 10 executes a transmission process to transmit the above-described display information (i.e., information used to display a window according to the status indicated by the operational context information) to the UI terminal 4 (i.e., the remote panel unit 120 in this case) used for login (step S70).

Subsequently, the information processing apparatus 10 executes an accepting process to accept an operation performed by the user A on the window displayed based on the display information (step S80). The information processing apparatus 10 then continues the process and completes the process (step S404) and executes a completion process upon the completion of the process (step S90). The completion process includes a process of notifying the user of the completion of the process instructed to be executed by the user, for example. If it is determined in step S402 that there is no information to be displayed (NO in step S402), the information processing apparatus 10 performs the operation of steps S404 and S90.

Details of the procedure of the operation illustrated in FIG. 16 will be described with reference to FIGS. 17 to 24.

Figure 17:
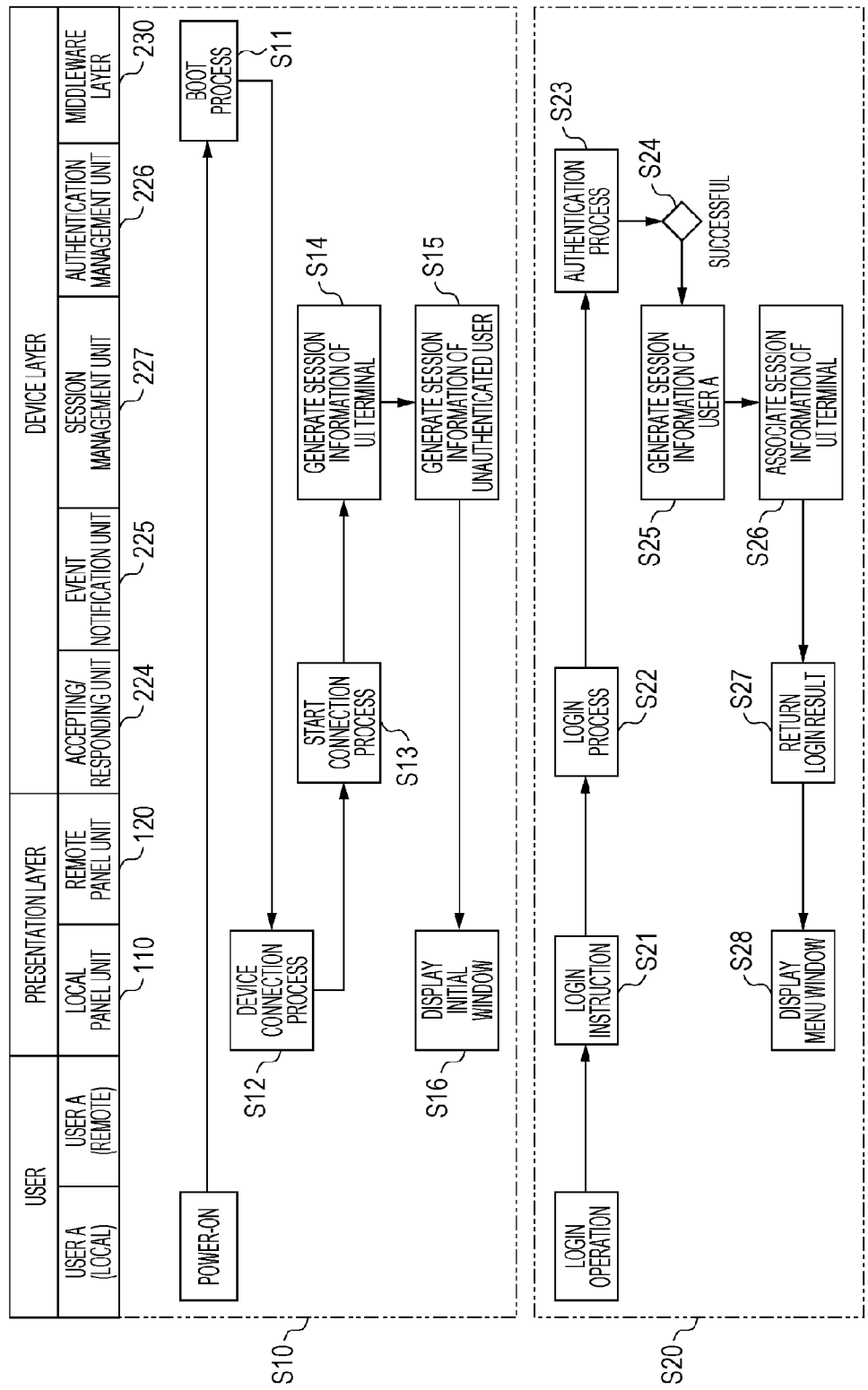
FIG. 17 illustrates an example of details of the procedure of the operation performed by the information processing system.

FIGS. 17 to 20 each illustrate an example of details of the procedure of the operation performed by the apparatuses (i.e., the information processing apparatus 10 and the user terminal 20) included in the information processing system 1. In FIGS. 17 to 20, procedures of operations performed by the presentation layer 100 (i.e., the local panel unit 110 and the remote panel unit 120) and the device layer 200 (i.e., the accepting/responding unit 224, the event notification unit 225, the session management unit 227, the authentication management unit 226, and the middleware layer 230) are illustrated separately. FIGS. 21 to 24 each illustrate an example of a window displayed by the presentation layer 100 in the procedure of the operation. Referring first to FIG. 17, a description will be given.

Upon the user A powering on the information processing apparatus 10, the middleware layer 230 executes a boot process to start various programs (step S11). Then, the local panel unit 110 executes a connection process to request the device layer 200 to establish a connection to the presentation layer 100 (step S12). Upon receipt of this request, the accepting/responding unit 224 starts a connection process to establish a connection between the presentation layer 100 and the device layer 200 (step S13) and notifies the session management unit 227 of the start of the connection process. The session management unit 227 then generates session information (specifically, terminal identification information) for the UI terminal 4 (i.e., the local panel unit 110 in this example) that has made the connection request (step S14).

The session management unit 227 also generates session information for an unauthenticated user (specifically, the user identification information "ANONYMOUS" illustrated in FIG. 8) (step S15). As a result, for example, the session information illustrated in FIG. 8 is stored in the session information storage unit 705. The session management unit 227 notifies the local panel unit 110, which is the UI terminal 4 identified by the terminal identification information, of information representing a window corresponding to the operational context information (i.e., the "INITIAL WINDOW" in the example illustrated in FIG. 8). In response to the notification, the local panel unit 110 displays the initial window represented by the notified information (step S16). Steps S11 to S16 indicate the procedure of the operation in step S10 (i.e., the boot process) illustrated in FIG. 16.

In response to the user A performing a login operation by using the local panel unit 110, the local panel unit 110 instructs the device layer 200 to execute a login process (step S21). Upon receipt of this instruction, the accepting/responding unit 224 starts the login process (step S22) and notifies the authentication management unit 226 of the start of the login process. The authentication management unit 226 then executes an authentication process by using the user ID and the password input in the login operation (step S23) and determines whether the authentication is successful (step S24). Upon determining that the authentication is successful, the authentication management unit 226 notifies the session management unit 227 that the authentication is successful. The session management unit 227 generates session information (specifically, user identification information) for the user A who has been successfully authenticated (step S25).

The session management unit 227 associates the session information for the UI terminal 4 with the generated user identification information (step S26). As a result, the session information stored in the session information storage unit 705 is updated to the one illustrated in FIG. 9. After finishing the association, the session management unit 227 notifies the accepting/responding unit 224 of the completion of the association. Upon receipt of this notification, the accepting/responding unit 224 transmits a response to the login instruction to notify the local panel unit 110 of the completion of the login process (step S27). Upon receipt of this notification, the local panel unit 110 displays, for example, a menu window G1 illustrated in FIG. 21 (step S28). Steps S21 to S28 indicate the procedure of the operation in step S20 (i.e., the login process (local)) illustrated in FIG. 16.

Figure 18:
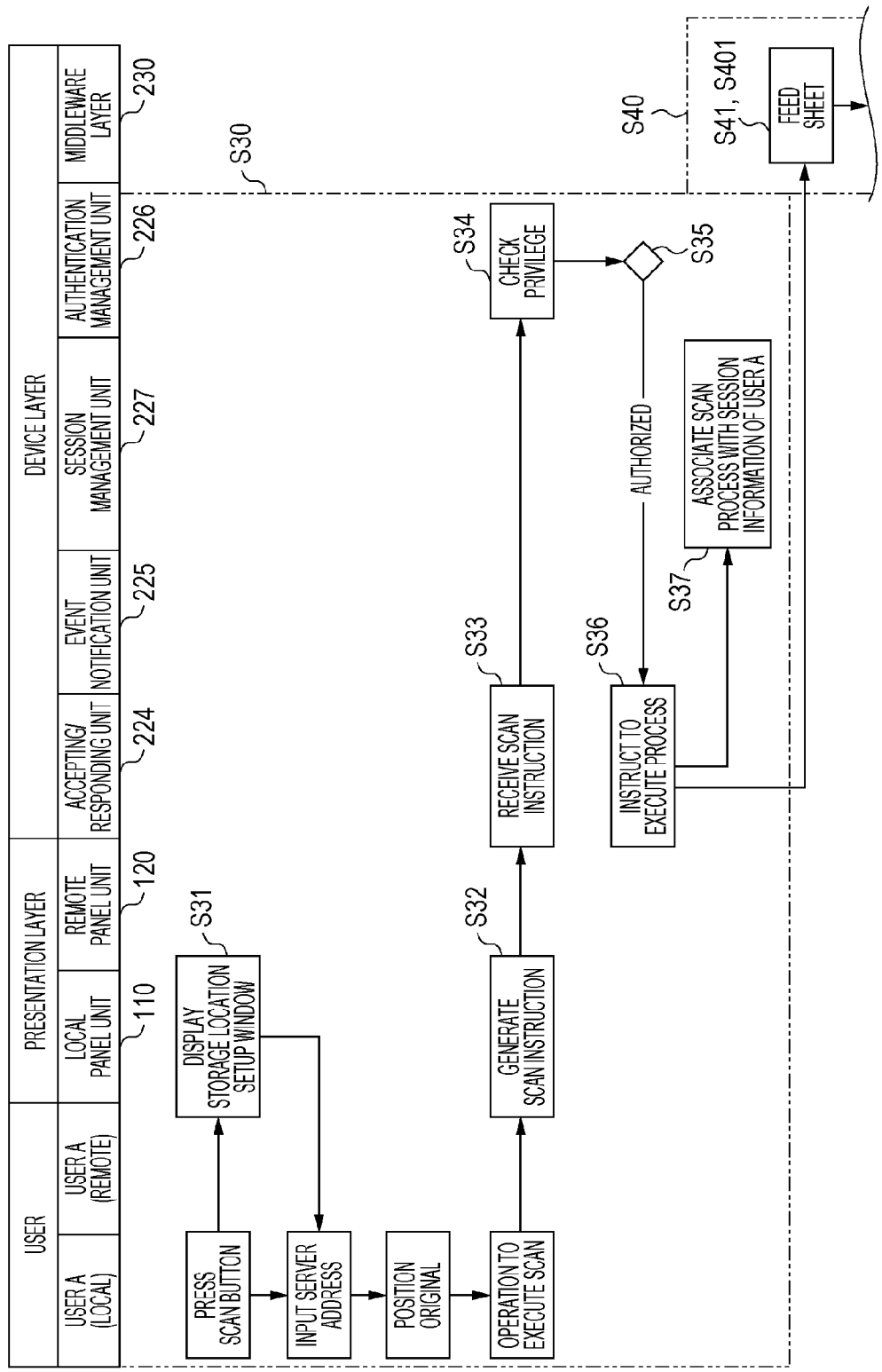
FIG. 18 illustrates an example of details of the procedure of the operation performed by the information processing system.

Referring next to FIG. 18, a description will be given. In response to the user A pressing a scan button on the displayed menu window, the local panel unit 110 displays, for example, a storage location setup window G2 illustrated in FIG. 22 (step S31). The storage location setup window G2 displays a field for accepting input of an address of a server serving as the storage location of image data of a scanned image and fields for accepting input of a user name and a password associated with the privilege to use the server as the storage location. In the example illustrated in FIG. 22, an operation to input the address of a server X is performed by the user A. Note that an operation performed on this window may be an operation to select a pre-registered address. In addition, the user name and the password input on this window may be the same as or different from the user name and the password used for login.

In response to the user performing an operation to start a scan process after loading the original, the local panel unit 110 creates instructions to execute the scan process (step S32) and transmits the created instructions to the device layer 200. Upon receipt of the instructions for the scan process (step S33), the accepting/responding unit 224 notifies the authentication management unit 226 of the receipt of the instructions. Upon receipt of this notification, the authentication management unit 226 checks whether the user A is authorized to execute the scan process, for example, by using the user name and the password used for login (step S34). Upon determining that the user A is authorized, the authentication management unit 226 notifies the accepting/responding unit 224 that the user A is authorized (step S35). After the privilege of the user A is confirmed, the accepting/responding unit 224 instructs the middleware layer 230 to execute the scan process (step S36).

The accepting/responding unit 224 also notifies the session management unit 227 that an instruction to execute the scan process has been issued. Upon receipt of this notification, the session management unit 227 stores process-related information concerning the scan process in association with the session information for the user A (step S37). As a result, the session information stored in the session information storage unit 705 is updated to the one illustrated in FIG. 10. Steps S31 to S37 indicate the procedure of the operation executed in step S30 (i.e., the execution instructing process) illustrated in FIG. 16. Upon receipt of the instruction from the accepting/responding unit 224, the middleware layer 230 first feeds paper (step S41). This operation in step S41 corresponds to the operation in step S401 (i.e., the start of the process) illustrated in FIG. 16.

Figure 19:
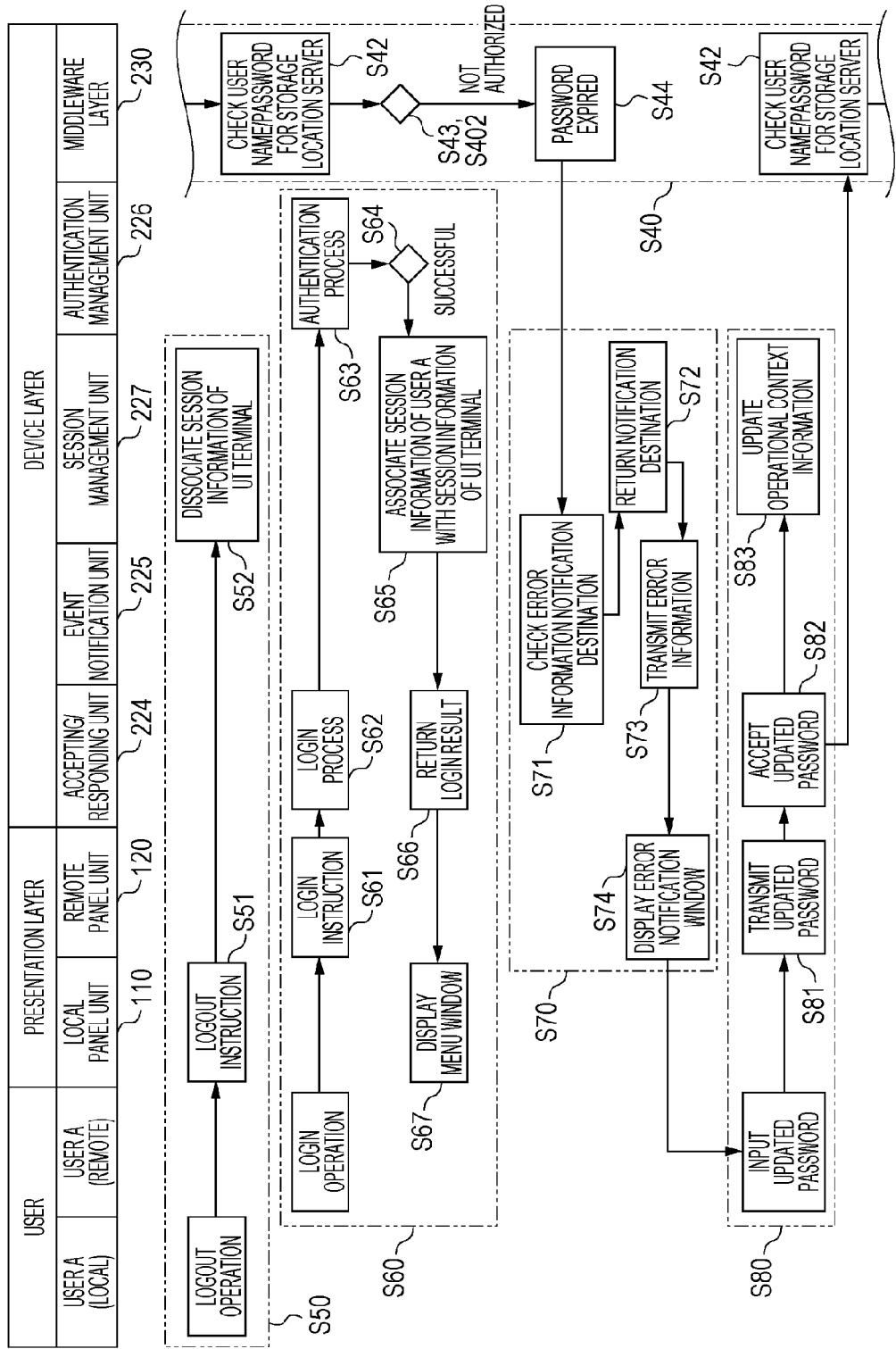
FIG. 19 illustrates an example of details of the procedure of the operation performed by the information processing system.

Referring next to FIG. 19, a description will be given. In this example, after the middleware layer 230 has started the process, the user A performs a logout operation by using the local panel unit 110. In response to the logout operation, the local panel unit 110 instructs the device layer 200 to execute a logout process (step S51). Upon receipt of this instruction, the session management unit 227 dissociates the session information for the UI terminal 4 (i.e., the local panel unit 110) from the session information for the user A (step S52). As a result, the session information stored in the session information storage unit 705 is updated to the one illustrated in FIG. 11. Steps S51 and S52 indicate the procedure of the operation in step S50 (i.e., the logout process) illustrated in FIG. 16.

Then, the user A performs a login operation by using the remote panel unit 120. In response to the login operation, the remote panel unit 120 instructs the device layer 200 to execute a login process (step S61). In steps S62 to S64, an operation similar to that performed in steps S22 to S24 illustrated in FIG. 17 is performed. Then, the session management unit 227 stores session information for the remote panel unit 120 in association with the session information for the user A (step S65), in place of the session information for the local panel unit 110 that has been dissociated in the logout process (step S50).

As a result, the session information stored in the session information storage unit 705 is updated to the one illustrated in FIG. 12 and is then updated so that the operational context information is inherited as illustrated in FIG. 13. Thereafter, in steps S66 and S67, an operation similar to that performed in steps S27 and S28 illustrated in FIG. 17 is performed. Steps S61 to S67 indicate the procedure of the operation in step S60 (i.e., the login process (remote)) illustrated in FIG. 16. The middleware layer 230 is executing the scan process in parallel with the logout process (step S50) and the login process (step S60).

Figure 22:
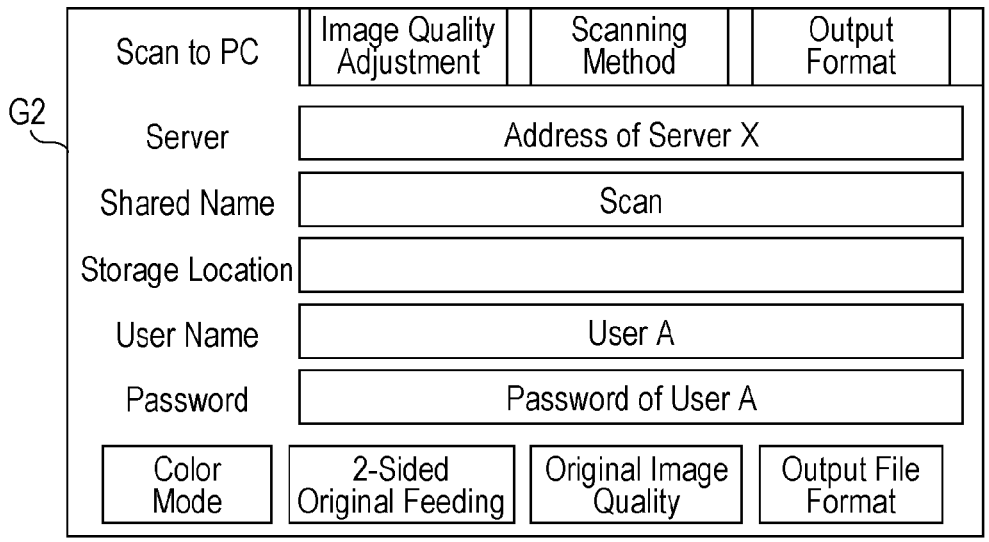
FIG. 22 illustrates a storage location setup window.

After starting the scan process in step S41, the middleware layer 230 checks whether the user A is authorized to use the server X as the storage location by using the user name and the password input on the storage location setup window G2 illustrated in FIG. 22 (step S42). In this example, the middleware layer 230 determines that the user A is not authorized because the input password has expired (step S43) and notifies the event notification unit 225 that the password has expired (step S44). The operation in step S43 corresponds to the operation in step S402 (i.e., determination indicating that there is information to be displayed) illustrated in FIG. 16. In this example, there is error information concerning an error of the expiry of the password.

Upon receipt of the notification from the middleware layer 230, the event notification unit 225 transmits an inquiry about the notification destination of the error information to the session management unit 227 (step S71). The session management unit 227 returns a response indicating the notification destination of the error information to the event notification unit 225 (step S72). In this example, the session management unit 227 returns a response indicating the remote panel unit 120, which is the UI terminal 4 identified by the terminal identification information associated with the user identification information for the user A illustrated in FIG. 13, as the notification destination.

The event notification unit 225 transmits the error information to the notification destination (i.e., the remote panel unit 120) indicated by the response (step S73). Based on the error information transmitted thereto, the remote panel unit 120 displays, for example, an error notification window G3 illustrated in FIG. 23 (step S74). The error notification window G3 displays the details about the error (the expiry of the password) and an instruction to resolve the error (input a new password). Steps S71 to S74 indicate the procedure of the operation in step S70 (i.e., the display information transmission process) illustrated in FIG. 16.

In response to the user A performing an operation to input an updated password whose expiration date has been updated on the error notification window G3, the remote panel unit 120 transmits the input updated password to the device layer 200 (step S81). The accepting/responding unit 224 accepts the updated password transmitted thereto (step S82). The accepting/responding unit 224 notifies the session management unit 227 and the middleware layer 230 that the updated password has been accepted. Upon receipt of this notification, the session management unit 227 stores the operational context information indicating that an operation to input the updated password has been performed by the user. As a result, the session information stored in the session information storage unit 705 is updated to the one illustrated in FIG. 13. Steps S81 to S83 indicate the procedure of the operation in step S80 (i.e., the user operation accepting process) illustrated in FIG. 16. On the other hand, upon receipt of the notification, the middleware layer 230 performs the above-described operation of step S42 (checks whether the user A is authorized).

Figure 20:
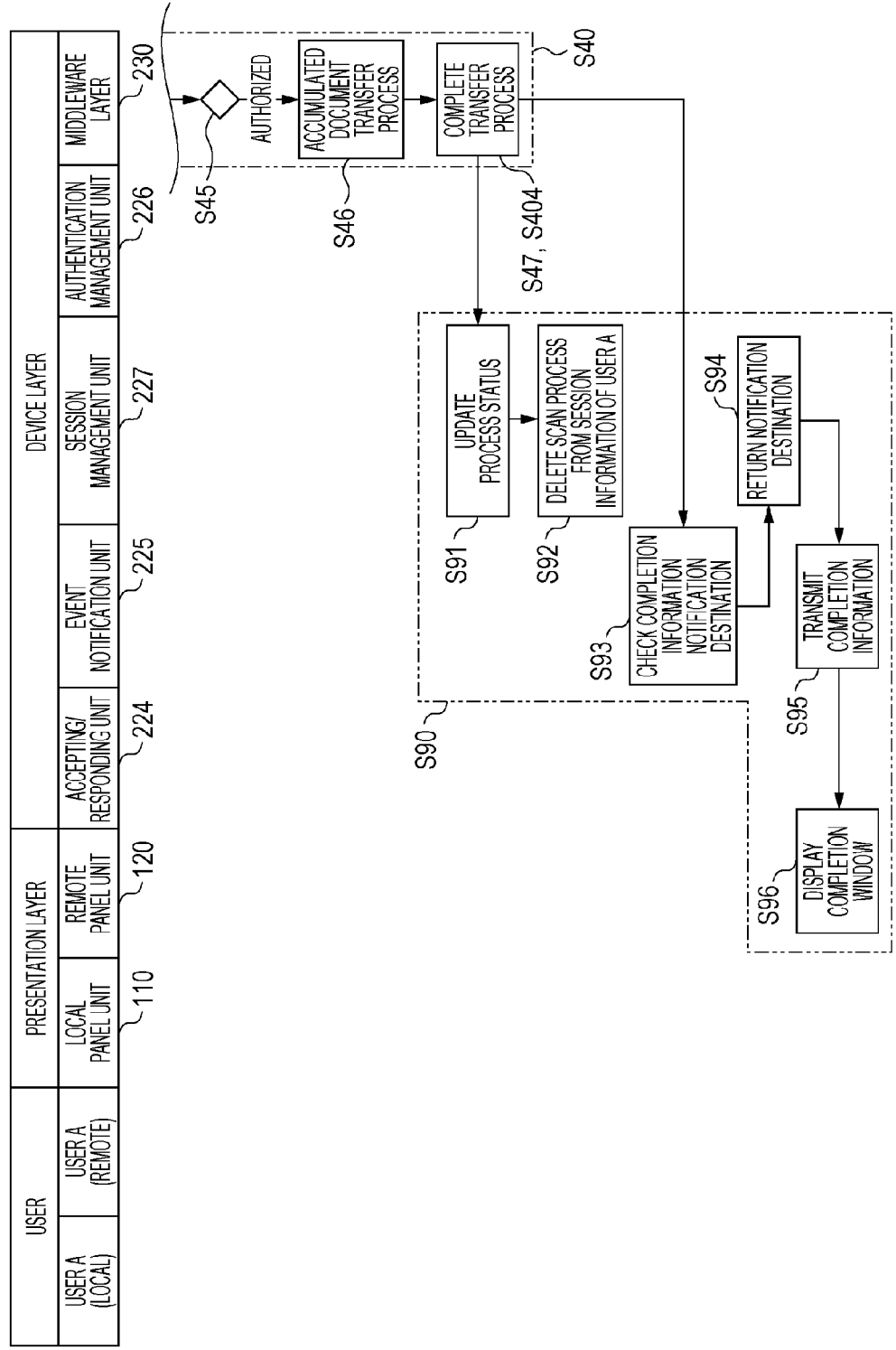
FIG. 20 illustrates an example of details of the procedure of the operation performed by the information processing system.
Figure 21:
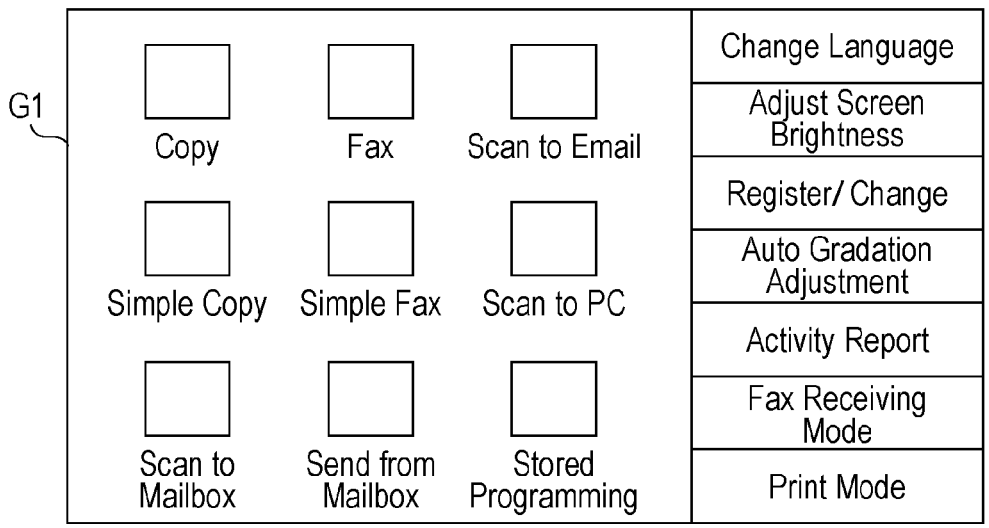
FIG. 21 illustrates a menu window.

Referring next to FIG. 20, a description will be given. The middleware layer 230 determines that the user A is authorized use the server X as the storage location (step S45) since the updated password whose expiration date has been updated is input and executes a process of transferring document data accumulated through the scan process to the server X serving as the storage location (step S46). After completing the document data transfer process (step S47), the middleware layer 230 notifies the event notification unit 225 and the session management unit 227 of the completion of the scan process. The operation in step S46 corresponds to the operation in step S403 (i.e., the completion of the process) illustrated in FIG. 16. The operation from step S41 to step S47 indicate the procedure of the operation in steps S401, S402, and S404 (i.e., the scan process) illustrated in FIG. 16.

Upon being notified of the completion of the scan process, the session management unit 227 updates the process status of the scan process that is associated with the session information for the user A (step S91). As a result, the session information stored in the session information storage unit 705 is updated to the one illustrated in FIG. 14. Thereafter, the session management unit 227 deletes the process-related information concerning the scan process (step S92). As a result, the session information stored in the session information storage unit 705 is updated to the one illustrated in FIG. 15. On the other hand, upon being notified of the completion of the scan process, the event notification unit 225 transmits, to the session management unit 227, an inquiry about the notification destination of the completion information, which indicates that the scan process has completed (step S93).

In this example, the session management unit 227 returns a response indicating, as the notification destination, the remote panel unit 120, which is the UI terminal 4 identified by the terminal identification information associated with the user identification information for the user A (step S94). The event notification unit 225 transmits the completion information to the notification destination (i.e., the remote panel unit 120) indicated by the response (step S95). Based on the completion information transmitted thereto, the remote panel unit 120 displays, for example, a scan process completion window G4 illustrated in FIG. 24 (step S96). Steps S91 to S96 indicate the procedure of the operation in step S90 (i.e., the completion process) illustrated in FIG. 16.

2 Modifications

The above-described exemplary embodiment is merely an example that embodies the present invention and may be modified in the following manner. In addition, the above-described exemplary embodiment and each of modifications described below may be appropriately combined.

2-1 Maintaining Association

In the exemplary embodiment, when the user stops using the first terminal for operation, the session associating/dissociating unit 703 dissociates the terminal identification information from the user identification information but maintains the association between the user identification information and the operational context information. In the example illustrated in FIG. 19, the operational context information is not dissociated from the session information for the user even after the session information for the UI terminal 4 is dissociated from the session information for the user in step S52 in response to the logout instruction given in step S51.

When the user starts using the second terminal, the session associating/dissociating unit 703 stores the terminal identification information for the second terminal in association with the user identification information from which the terminal identification information for the first terminal has been dissociated. In the example illustrated in FIG. 19, this operation corresponds to the operation in step S65. In the example illustrated in FIG. 19, the above-described information to be displayed (e.g., information prompting the user to perform an operation to continue the process) occurs after the association of the terminal identification information for the second terminal; however, such information may occur before the association of the terminal identification information for the second terminal.

In the case where the above-described information to be displayed occurs in a dissociation period, which is a period over which the terminal identification information is dissociated from the user identification information as described above, the event notification unit 225 does not transmit the above-described display information (i.e., information used to display a window corresponding to the status indicated by the operational context information). In the example illustrated in FIG. 19, the dissociation period is a period from the dissociation performed in step S52 to the association of the terminal identification information for the second terminal (i.e., the remote panel unit 120) with the user identification information performed in step S65, that is, a period over which the user does not perform any operation by using the UI terminal 4 except for the login operation.

The event notification unit 225 transmits the display information upon the terminal identification information for the second terminal being stored in association with the user identification information from which the terminal identification information for the first terminal has been dissociated. With this configuration, even in the case where information to be displayed occurs in a period over which the user does not perform any operation by using the UI terminal 4 except for the login operation (i.e., the dissociation period), the information is displayed on the UI terminal 4 used by the user thereafter.

Note that the period over which the association between the user identification information and the operational context information is maintained may be limited. For example, a value obtained by multiplying a time taken to move over a distance between the installed locations of the first terminal and the second terminal (e.g., the distance between the installed location of the information processing apparatus 10 and the desk of the user at the office) by a margin may be set as the upper limit. In this case, if the user returns to their desk right away after starting the process by operating the local panel unit 110, the window displayed on the local panel unit 110 is displayed when the user performs an operation to continue the process by using the remote panel unit 120. However, if the user returns to their desk after finishing some other business, the set period elapses and the user is required to start the operation again on the menu window.

2-2 Notifying User

If information to be displayed occurs in the above-described dissociation period, the user may be notified of the occurrence of such information.

Figure 25:
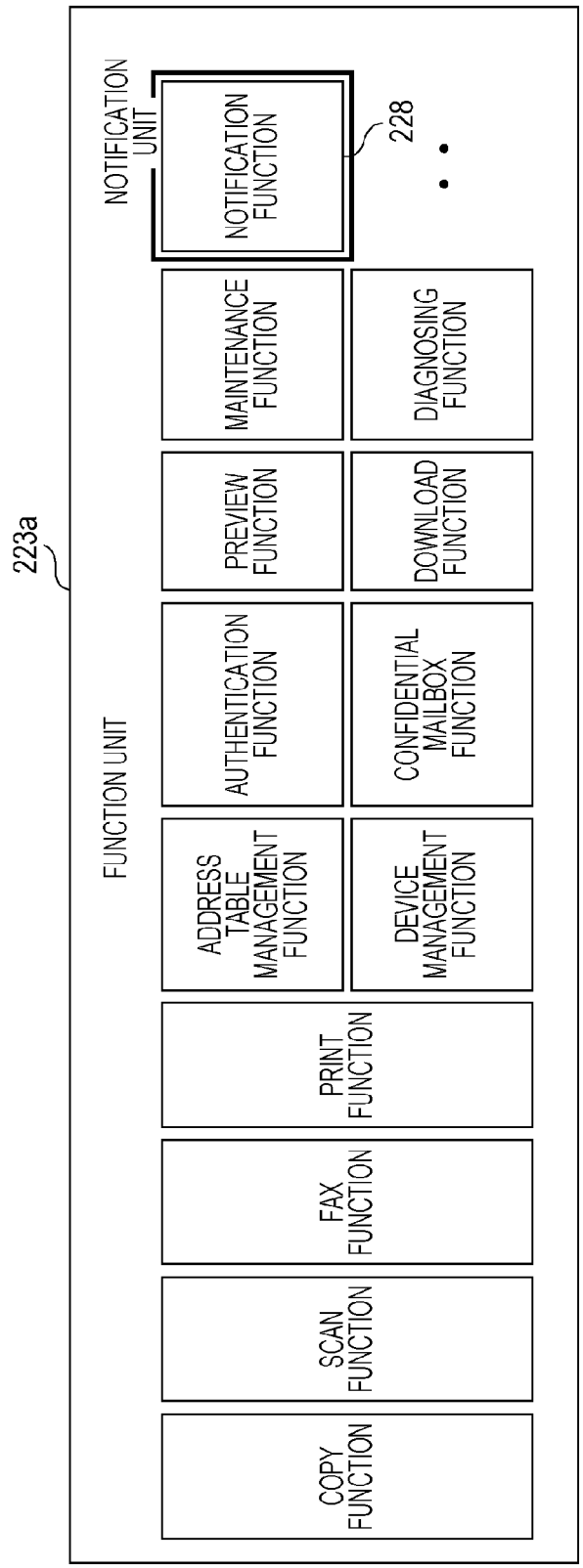
FIG. 25 illustrates an example of a configuration of a function unit according to a modification.

FIG. 25 illustrates an example of a configuration of a function unit 223a according to a modification. The function unit 223a includes a module that implements a notification function 228 in addition to the modules that implement the functions illustrated in FIG. 7. The notification function 228 notifies, in response to occurrence of information to be displayed in a dissociation period, an address associated with the user identified by the user identification information of the occurrence of the information to be displayed. The notification function 228 is an example of a "notification unit" according to an aspect of the present invention.

For example, an email address of the user, a social networking service (SNS) account of the user, or an IP address of the user terminal 20 may be used as the address associated with the user, and such an address is stored in association with the user identification information of each user. For example, in the example illustrated in FIG. 19, if the middleware layer 230 determines in step S44 that the password has expired before the terminal identification information for the second terminal is associated with the user identification information for the user A in step S65, the middleware layer 230 notifies the notification function 228 of the expiry of the password.

Upon receipt of this notification, the notification function 228 transmits, to the address stored in association with the user A, an email containing, for example, a hyperlink to the error notification window G3 illustrated in FIG. 23 in its body as the information indicating that the password has expired. In this case, even if the user is using the user terminal 20 not as the remote panel unit 120 but for another purpose, the user is informed that the authentication is unsuccessful by opening the email and is permitted to perform an operation to continue the process by opening the error notification window G3 by using the hyperlink (and performing a login operation if necessary at that time).

2-3 Terminating Process

Figure 26:
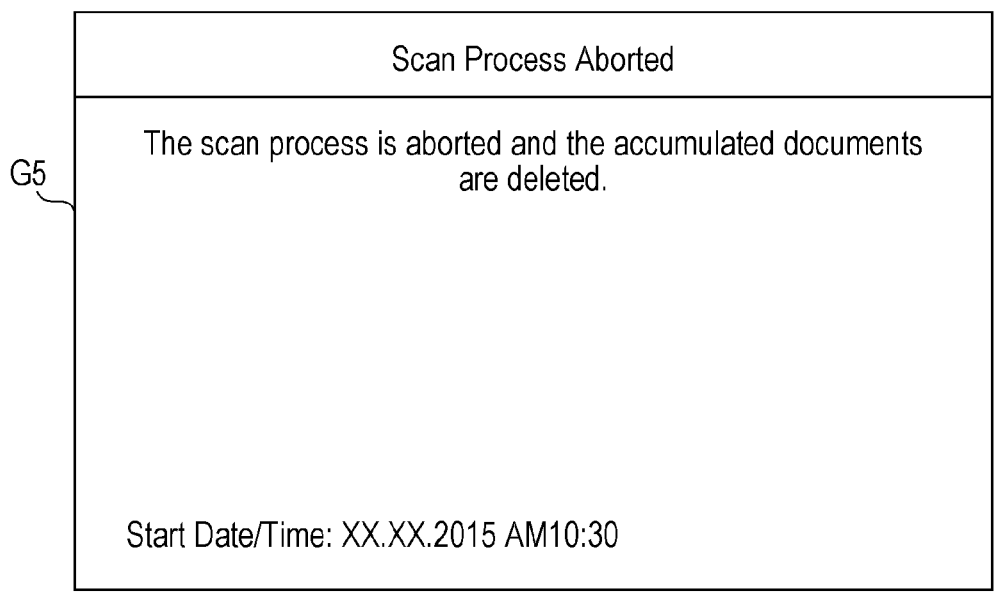
FIG. 26 illustrates a scan process abort window.

In the modification described above, in the case where information to be displayed occurs in a dissociation period, the user is notified of the occurrence of such information; however, the configuration is not limited to this one. In another modification, the middleware layer 230, which is an example of the execution unit according to an aspect of the present invention, terminates an executed process in response to the occurrence of information to be displayed in a dissociation period, even when there is no user operation. For example, in the example illustrated in FIG. 19, if the middleware layer 230 determines in step S44 that the password has expired during execution of the scan process, the middleware layer 230 discharges paper and terminates the scan process by deleting data of the scanned document (accumulated document) without transferring it. In this case, the scan process is aborted before it is completed. The middleware layer 230 then notifies the event notification unit 225 and the session management unit 227 that the scan process has been aborted. After the user A logs in by using the remote panel unit 120, the event notification unit 225 notifies the remote panel unit 120 of abort information indicating that the scan process has been aborted. Based on the abort information transmitted thereto, the remote panel unit 120 displays, for example, a scan process abort window G5 illustrated in FIG. 26. On the other hand, upon receipt of the notification, the session management unit 227 performs the operation in step S91 (updates the process status) and S92 (deletes the scan process from the session information for the user A) illustrated in FIG. 20.

2-4 Selectively Using Notification and Termination of Process

In the modification described above, in the case where information to be displayed occurs in a dissociation period, the configuration is set so that the user is notified of the occurrence of such information or the executed process is terminated; however, these configurations may be selectively used depending on the situation. For example, it is assumed that data processed by the middleware layer 230 is classified into two or more categories. The two or more categories may include, for example, a category (referred to as a first category) for confidential data including confidential information and a category (referred to as a second category) for non-confidential data not including confidential information.

In this modification, if data processed by the middleware layer 230 when information to be displayed occurs in a dissociation period is classified into the first category, the notification function 228 illustrated in FIG. 25 notifies the address associated with the user identified by the user identification information of the occurrence of the information to be displayed. This notification is made in a manner as described in the above modification. On the other hand, if the data processed by the middleware layer 230 when information to be displayed occurs in a dissociation period is classified into the second category, the middleware layer 230 terminates the executed process even when there is no user operation.

As described above, data (i.e., confidential data in this example) for which the process executed by the middleware layer 230 is continued is desirably classified into the first category, and data (i.e., non-confidential data in this example) for which no inconvenience is caused by terminating the process is desirably classified into the second category. Note that notifying the user and terminating the process may be selectively used based on factors other than the data categories. For example, the configurations may be selectively used depending on whether the UI terminal 4 that has started the process is a local terminal or a remote terminal. Specifically, if the UI terminal 4 that has started the process is the operation terminal 30, the user is notified. If the UI terminal 4 that has started the process is the user terminal 20, the process may be terminated. In addition, the configurations may be selectively used depending on the type of the process. Specifically, if the executed process is a process involving scanning a sheet, such as a scan process or a copy process, the user is notified. If the executed process is a process not involving scanning a sheet, such as a print process instructed by the user terminal 20, the process may be terminated.

2-5 Use of Short-Range Communication

Near Field Communication, Bluetooth (registered trademark), or short-range communication that enables tag-based or wireless exchange of authentication information based on a piconet, which is dynamically formed by plural Bluetooth devices when the Bluetooth devices come near, may be used for switching from the first terminal to the second terminal.

Figure 27:
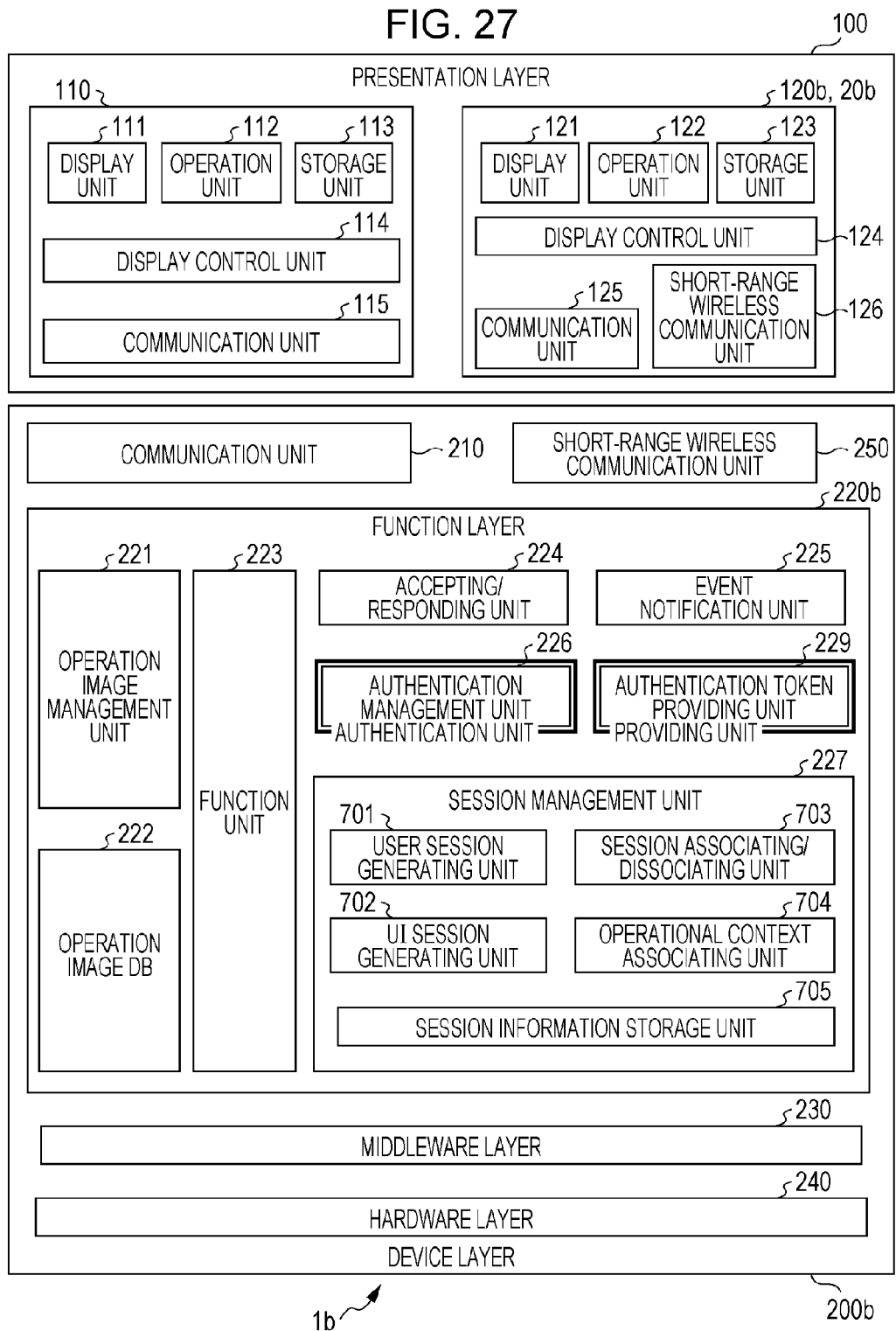
FIG. 27 illustrates an overall configuration of an information processing system according to a modification.

FIG. 27 illustrates an overall configuration of an information processing system 1b according to a modification. The information processing system 1b includes a remote panel unit 120b and a device layer 200b. The remote panel unit 120b includes a short-range wireless communication unit 126 in addition to the units illustrated in FIG. 6. The device layer 200b includes a short-range wireless communication unit 250 and an authentication token providing unit 229 included in a function layer 220b in addition to the units illustrated in FIG. 6. The short-range wireless communication units 126 and 250 perform, as short-range wireless communication, NFC communication based on NFC in this modification.

The remote panel unit 120b is implemented by a user terminal 20b that is portable by the user, such as a smartphone or a tablet terminal. The short-range wireless communication unit 126 performs NFC communication with the short-range wireless communication unit 250 when the user terminal 20b is placed over or on the short-range wireless communication unit 250. In addition, the short-range wireless communication unit 126 includes a storage unit and stores data to be exchanged via NFC communication. The short-range wireless communication unit 250 has a function of an NFC tag and performs NFC communication with the short-range wireless communication unit 126 when the user terminal 20b is placed thereover or thereon.

When the short-range wireless communication unit 250 performs NFC communication with the second terminal (e.g., the remote panel unit 120b) in the state where the first terminal (e.g., the local panel unit 110) is identified by the terminal identification information stored in association with the user identification information in the session information storage unit 705, the authentication token providing unit 229 provides the second terminal with an authentication token via the NFC communication. An authentication token is information indicating that the user (i.e., the user A in this example) identified by the user identification information associated with the terminal identification information for the first terminal has been authenticated, and is an example of certificate information according to an aspect of the present invention.

The authentication token received by the short-range wireless communication unit 126 is stored, for example, in the storage unit 123 of the remote panel unit 120b. Thereafter, the user A performs a logout operation by using the local panel unit 110 and operates the user terminal 20b to start a program (e.g., a browser program) that implements the remote panel unit 120b. At that time, the display control unit 124 usually displays a login window allowing the user to input the user ID and the password; however, in the case where the authentication token is stored in the storage unit 123, the display control unit 124 does not display the login window. When the authentication token is stored in the storage unit 123, the communication unit 125 reads the authentication token and transmits the authentication token to the authentication management unit 226 via the communication unit 210.

Upon receipt of the authentication token from the user terminal 20b, which is the second terminal, the authentication management unit 226 authenticates the user A indicated by the authentication token as a user who operates the information processing apparatus 10. In this modification, an operation to input the user ID and the password is omitted when the user performs login by using the remote panel unit 120b if the user places the user terminal 20b over or on the short-range wireless communication unit 250 after starting execution of the process by operating the local panel unit 110.

Note that if NFC communication is performed between the short-range wireless communication units 250 and 126, it may be considered that a logout operation is performed. In this case, in response to NFC communication, the session management unit 227 performs the operation in step S52 (dissociates the session information for the UI terminal 4) illustrated in FIG. 19. This configuration also omits a user logout operation.

2-6 First Terminal and Second Terminal

The exemplary embodiment has described the case where the operation terminal 30 serves as the first terminal and the user terminal 20 serves as the second terminal; however, the configuration is not limited to this case. The user terminal 20 may serve as the first terminal, and the operation terminal 30 may serve as the second terminal; or two different user terminals 20 may serve as the first and second terminals.

2-7 Functional Configuration Implementing Each Unit

In the exemplary embodiment and modifications described above, the event notification unit 225, the authentication management unit 226, the session associating/dissociating unit 703, the session information storage unit 705, the middleware layer 230, and the notification function 228 respectively correspond to examples of the transmission unit, the authentication unit, the memory controller, the memory, the execution unit, and the notification unit according to an aspect of the present invention; however, the configuration is not limited to this example. For example, as for the execution unit, the function unit 223 may function as the execution unit or the function unit 223 and the middleware layer 230 may collaboratively function as the execution unit. In addition, for example, the accepting/responding unit 224 may function as the transmission unit, and the user session generating unit 701, the UI session generating unit 702, the session associating/dissociating unit 703, and the operational context associating unit 704 may collaboratively function as the memory controller. In addition, the middleware layer 230 may function as the notification unit.

2-8 Display Information

In the exemplary embodiment, the operational context information is used as the display information; however, the display information is not limited to this information. For example, a code corresponding to a window or operation image to be displayed may be used as the display information. In this case, the UI terminal 4 may display a window or image corresponding to the code transmitted thereto.

2-9 Information to Be Displayed

In the exemplary embodiment, information prompting the user to perform an operation to continue the process executed by the function unit 223 is used as the information to be displayed; however, the information to be displayed is not limited to this information. For example, any information to be displayed on the UI terminal 4 during execution of the process, for example, information indicating the status of the process or information to be displayed upon completion of the process, may be used as the information to be displayed.

2-10 Categories of Invention

The present invention is considered as an information processing apparatus, a user terminal, and an information processing system including an information processing apparatus and a user terminal, and an information processing method for implementing a process executed by the information processing apparatus and the user terminal. In addition, the present invention is considered also as a program causing computers serving as the information processing apparatus and the user terminal to function as the units described above. The program may be provided in a form of a recording medium, such as an optical disc storing the program thereon, or may be provided in a manner such that the program is downloaded and installed to the computers via a communication line, such as the Internet, so as to be usable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores user identification information, terminal identification information, and operational context information in association with one another,
wherein the user identification information identifies a user,
wherein the terminal identification information identifies a terminal that is configured to execute a user interface of the information processing apparatus and that is configured to display a window corresponding to an operation initiated by the user, and
wherein the operational context information indicates a status of the operation;
at least one processor configured to execute:
an execution unit that executes a process;
a memory controller that controls, in response to the user switching the terminal used for operation from a first terminal to a second terminal, the memory to change the terminal identification information associated with the user identification information identifying the user from information identifying the first terminal to information identifying the second terminal; and
a transmission unit that transmits, in response to occurrence of information to be displayed in relation to the process started in response to an operation performed by using the first terminal, display information to the second terminal in a case where the terminal identification information has been changed,
wherein the display information is configured to enable display of a window associated with the status indicated by the operational context information that is associated with the terminal identification information,
wherein in the case where the user stops using the first terminal for operation, the memory controller dissociates the terminal identification information from the user identification information but maintains association between the user identification information and the operational context information,
wherein the memory controller controls the memory to store the terminal identification information identifying the second terminal in association with the user identification information identifying the user, in response to the user who has stopped using the first terminal for operation starting using the second terminal,
wherein the transmission unit does not transmit the display information in a case where the information to be displayed occurs in a dissociation period over which no terminal identification information is associated with the user identification information and transmits the display information in response to the terminal identification information identifying the second terminal being stored in association with the user identification information,
wherein the at least one processor is further configured to execute:
a notification unit that notifies, in a case where the information to be displayed occurs in the dissociation period, an address associated with the user identified by the user identification information of the occurrence of the information to be displayed, wherein data processed by the execution unit is classified into two or more categories including a first category and a second category, wherein the notification unit notifies, in a case where the data processed when the information to be displayed occurs in the dissociation period is classified into the first catepory, the address associated with the user identified by the user identification information of the occurrence of the information to be displayed, and wherein the execution unit ends the process being executed, in a case where the data processed when the information to be displayed occurs in the dissociation period is classified into the second category, even when no operation is initiated by the user.

2. The information processing apparatus according to claim 1, wherein the display information comprises information prompting the user to perform an operation to continue the process, and wherein the execution unit continues the process in a case where the user performs the operation to continue the process on the second terminal that displays the window by using the display information.

3. The information processing apparatus according to claim 1, wherein the at least one processor is further configured to execute:

a short-range wireless communication unit that performs short-range wireless communication;

an authentication unit that authenticates a user who operates the information processing apparatus; and a providing unit that provides, in a state where the first terminal is identified by the terminal identification information stored in association with the user identification information, the second terminal via the short-range wireless communication with certificate information indicating that the user identified by the user identification information has been authenticated, wherein the authentication unit receives the certificate information from the second terminal and authenticates the user indicated by the certificate information as the user who operates the information processing apparatus, and wherein the transmission unit transmits, to the second terminal, the display information, which is configured to enable display of a window associated with the status indicated by the operational context information that is associated with the terminal identification information identifying the first terminal.

4. The information processing apparatus according to claim 1, wherein the operational context information includes information indicating a history of operations performed on the first terminal, and wherein the transmission unit transmits the display information, which is configured to enable display of a window displayed on the first terminal in the past in accordance with the history of operations indicated by the operational context information.

5. The information processing apparatus according to claim 1, wherein the execution unit ends the process being executed, in a case where the information to be displayed occurs in the dissociation period, even when no operation is initiated by the user.

6. An information processing system comprising: the information processing apparatus according to claim 1, the information processing apparatus including the first terminal configured to execute the user interface of the information processing apparatus and to display the window corresponding to the operation initiated by the user; and a second terminal configured to execute the user interface of the information processing apparatus and to display the window corresponding to the operation initiated by the user.

7. An information processing method comprising:

storing, in a memory, user identification information, terminal identification information, and operational context information in association with one another, wherein the user identification information identifies a user, wherein the terminal identification information identifies a terminal that is configured to execute a user interface of an information processing apparatus and that is configured to display a window corresponding to an operation initiated by the user, and wherein the operational context information indicates a status of the operation;

executing a process;

controlling, in response to the user switching the terminal used for operation from a first terminal to a second terminal, the memory to change the terminal identification information associated with the user identification information identifying the user from information identifying the first terminal to information identifying the second terminal; and transmitting, in response to occurrence of information to be displayed in relation to the process started in response to an operation performed by using the first terminal, display information to the second terminal in a case where the terminal identification information has been changed, wherein the display information is configured to enable display of a window associated with the status indicated by the operational context information that is associated with the terminal identification information, wherein in the case where the user stops using the first terminal for operation, the controlling dissociates the terminal identification information from the user identification information but maintains association between the user identification information and the operational context information, wherein the controlling controls the memory to store the terminal identification information identifying the second terminal in association with the user identification for operation starting using the second terminal, wherein the transmitting does not transmit the display information in a case where the information to be displayed occurs in a dissociation period over which no terminal identification information is associated with the use identification information and does transmit the display information in response to the terminal identification information identifying the second terminal being stored in association with the user identification information, wherein the method further comprises:

notifying, in case where the information to be displayed occurs in the dissociation period, an address associated with the user identified by the user identification information of the occurrence of the information to be displayed, wherein data processed by the executing is classified into two or more categories including a first category and a second category, wherein the notifying comprises notifying, in a case where the data processed when the information to be displayed occurs in the dissociation period is classified into the first category, the address associated with the user identified by the user identification information of the occurrence of the information to be displayed, and wherein the executing ends the process being executed, in a case where the data processed when the information to be displayed occurs in the dissociation period is classified into the second category, even when no operation is initiated by the user.

* * * * *